United States Patent
Abdallah

(10) Patent No.: US 9,575,762 B2
(45) Date of Patent: *Feb. 21, 2017

(54) METHOD FOR POPULATING REGISTER VIEW DATA STRUCTURE BY USING REGISTER TEMPLATE SNAPSHOTS

(71) Applicant: Soft Machines, Inc., Santa Clara, CA (US)

(72) Inventor: Mohammad Abdallah, San Jose, CA (US)

(73) Assignee: SOFT MACHINES INC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/213,854

(22) Filed: Mar. 14, 2014

(65) Prior Publication Data

US 2014/0281428 A1    Sep. 18, 2014

Related U.S. Application Data

(60) Provisional application No. 61/799,006, filed on Mar. 15, 2013.

(51) Int. Cl.
*G06F 9/30*    (2006.01)
*G06F 9/38*    (2006.01)

(52) U.S. Cl.
CPC .......... *G06F 9/3836* (2013.01); *G06F 9/3838* (2013.01); *G06F 9/3851* (2013.01); *G06F 9/3853* (2013.01); *G06F 9/3893* (2013.01)

(58) Field of Classification Search
None
See application file for complete search history.

(56) References Cited

U.S. PATENT DOCUMENTS 4,727,487 A    2/1988  Masui et al.
5,404,470 A *  4/1995  Miyake ........................ 712/217
(Continued)

FOREIGN PATENT DOCUMENTS

CN    1841314    10/2006
TW     544626    8/2003
(Continued)

OTHER PUBLICATIONS

Mogul et al; "Potential benefits of delta encoding and data compression for HTTP"; Oct. 1, 1997; ACM; SIGCOMM '97; pp. 181-194.

*Primary Examiner* — William B Partridge

(57) ABSTRACT

A method for populating a register view data structure by using register template snapshots. The method includes receiving an incoming instruction sequence using a global front end; grouping the instructions to form instruction blocks; using a plurality of register templates to track instruction destinations and instruction sources by populating the register template with block numbers corresponding to the instruction blocks, wherein the block numbers corresponding to the instruction blocks indicate interdependencies among the blocks of instructions; populating a register view data structure, wherein the register view data structure stores destinations corresponding to the instruction blocks as recorded by the plurality of register templates; and using the register view data structure to track a machine state in accordance with the execution of the plurality of instruction blocks.

18 Claims, 38 Drawing Sheets

(56) References Cited

U.S. PATENT DOCUMENTS

| | | | |
|---|---|---|---|
| 5,724,565 A | 3/1998 | Dubey et al. | |
| 5,751,982 A | 5/1998 | Morley | |
| 5,761,476 A | 6/1998 | Martell | |
| 5,819,088 A | 10/1998 | Reinders | |
| 5,911,057 A | 6/1999 | Shiell | |
| 6,216,215 B1 | 4/2001 | Palanca et al. | |
| 6,308,323 B1 | 10/2001 | Douniwa | |
| 6,345,357 B1 | 2/2002 | Sato | |
| 6,490,673 B1 | 12/2002 | Heishi et al. | |
| 6,529,928 B1 | 3/2003 | Resnick et al. | |
| 6,557,095 B1* | 4/2003 | Henstrom | 712/216 |
| 6,668,316 B1 | 12/2003 | Gorshtein et al. | |
| 6,704,860 B1 | 3/2004 | Moore | |
| 6,948,172 B1 | 9/2005 | D'Souza et al. | |
| 7,020,879 B1 | 3/2006 | Nemirovsky et al. | |
| 7,707,578 B1 | 4/2010 | Zedlewski et al. | |
| 7,757,065 B1 | 7/2010 | Jordan et al. | |
| 3,044,951 A1 | 10/2011 | Brown et al. | |
| 3,046,775 A1 | 10/2011 | Kang et al. | |
| 8,145,882 B1* | 3/2012 | Kishore et al. | 712/34 |
| 8,200,949 B1 | 6/2012 | Tarjan et al. | |
| 8,539,486 B2 | 9/2013 | Cain, III et al. | |
| 2002/0029308 A1 | 3/2002 | Babaian et al. | |
| 2002/0062435 A1 | 5/2002 | Nemirovsky et al. | |
| 2003/0093776 A1 | 5/2003 | Hilton | |
| 2003/0233394 A1 | 12/2003 | Rudd et al. | |
| 2004/0078538 A1 | 4/2004 | Dutt et al. | |
| 2004/0098567 A1 | 5/2004 | Hansen et al. | |
| 2004/0158822 A1 | 8/2004 | Sandham et al. | |
| 2004/0187123 A1 | 9/2004 | Tremblay et al. | |
| 2005/0114603 A1 | 5/2005 | Buti et al. | |
| 2005/0120194 A1 | 6/2005 | Kissell | |
| 2005/0289530 A1 | 12/2005 | Robison | |
| 2006/0161921 A1 | 7/2006 | Kissell | |
| 2006/0179257 A1 | 8/2006 | Chu et al. | |
| 2006/0179281 A1 | 8/2006 | Jensen et al. | |
| 2006/0212687 A1 | 9/2006 | Chen et al. | |
| 2006/0230243 A1 | 10/2006 | Cochran et al. | |
| 2006/0230409 A1 | 10/2006 | Frigo et al. | |
| 2006/0282839 A1 | 12/2006 | Hankins et al. | |
| 2007/0006231 A1 | 1/2007 | Wang et al. | |
| 2007/0198665 A1 | 8/2007 | De Matteis et al. | |
| 2008/0016507 A1 | 1/2008 | Thomas et al. | |
| 2008/0104598 A1 | 5/2008 | Chang | |
| 2008/0148237 A1 | 6/2008 | Jiang et al. | |
| 2008/0250227 A1 | 10/2008 | Linderman et al. | |
| 2008/0320476 A1 | 12/2008 | Wingard et al. | |
| 2009/0019264 A1 | 1/2009 | Correale, Jr. et al. | |
| 2009/0113170 A1 | 4/2009 | Abdallah | |
| 2009/0138670 A1 | 5/2009 | Mutlu et al. | |
| 2009/0150647 A1 | 6/2009 | Mejdrich et al. | |
| 2009/0165007 A1 | 6/2009 | Aghajanyan | |
| 2009/0282101 A1 | 11/2009 | Lim et al. | |
| 2009/0307450 A1 | 12/2009 | Lee | |
| 2009/0328053 A1 | 12/2009 | Dice | |
| 2010/0100690 A1 | 4/2010 | Rajamani et al. | |
| 2010/0115244 A1 | 5/2010 | Jensen et al. | |
| 2010/0154042 A1 | 6/2010 | Miyamoto et al. | |
| 2010/0161948 A1* | 6/2010 | Abdallah | 712/228 |
| 2010/0205603 A1 | 8/2010 | Merten et al. | |
| 2010/0280996 A1 | 11/2010 | Gross, IV et al. | |
| 2010/0286976 A1 | 11/2010 | Gao et al. | |
| 2010/0299671 A1* | 11/2010 | Kinsey | 718/104 |
| 2010/0306503 A1 | 12/2010 | Henry et al. | |
| 2010/0325394 A1 | 12/2010 | Golla et al. | |
| 2011/0055479 A1 | 3/2011 | West et al. | |
| 2011/0067016 A1 | 3/2011 | Mizrachi et al. | |
| 2011/0093857 A1 | 4/2011 | Sydow et al. | |
| 2012/0023318 A1 | 1/2012 | Xing et al. | |
| 2012/0066483 A1 | 3/2012 | Boury et al. | |
| 2012/0089812 A1 | 4/2012 | Smith | |
| 2012/0246450 A1 | 9/2012 | Abdallah | |
| 2013/0036296 A1 | 2/2013 | Hickey et al. | |
| 2013/0283286 A1 | 10/2013 | Lee et al. | |
| 2014/0181833 A1 | 6/2014 | Bird et al. | |
| 2014/0281411 A1 | 9/2014 | Abdallah | |
| 2014/0281412 A1 | 9/2014 | Abdallah | |
| 2014/0281416 A1 | 9/2014 | Abdallah | |
| 2014/0281426 A1 | 9/2014 | Abdallah | |
| 2014/0281427 A1 | 9/2014 | Abdallah | |
| 2014/0281436 A1 | 9/2014 | Abdallah | |
| 2014/0282592 A1 | 9/2014 | Abdallah | |
| 2014/0282601 A1 | 9/2014 | Abdallah | |
| 2014/0317387 A1 | 10/2014 | Abdallah | |
| 2014/0373022 A1 | 12/2014 | Chan | |
| 2015/0046683 A1 | 2/2015 | Abdallah | |
| 2015/0046686 A1 | 2/2015 | Abdallah | |

FOREIGN PATENT DOCUMENTS

| | | |
|---|---|---|
| TW | 200422949 | 11/2004 |
| TW | 200813766 | 3/2008 |
| TW | 200949690 | 12/2009 |
| TW | I329437 | 8/2010 |
| TW | I331282 | 10/2010 |
| TW | I352288 | 11/2011 |
| TW | 201227520 | 7/2012 |
| TW | 201241744 | 10/2012 |
| TW | 201305819 | 2/2013 |
| WO | 2010049585 | 5/2010 |

* cited by examiner

Fig. 24

METHOD FOR POPULATING REGISTER VIEW DATA STRUCTURE BY USING REGISTER TEMPLATE SNAPSHOTS

This application claims the benefit co-pending commonly assigned U.S. Provisional Patent Application Ser. No. 61/799,006, titled "METHOD FOR POPULATING REGISTER VIEW DATA STRUCTURE BY USING REGISTER TEMPLATE SNAPSHOTS" by Mohammad A. Abdallah, filed on Mar. 15, 2013, and which is incorporated herein in its entirety.

CROSS REFERENCE TO RELATED APPLICATION

This application is related to co-pending commonly assigned US Patent Application Publication Number 2009/0113170, titled "APPARATUS AND METHOD FOR PROCESSING AN INSTRUCTION MATRIX SPECIFYING PARALLEL INDEPENDENT OPERATIONS" by Mohammad A. Abdallah, filed on Apr. 12, 2007, and which is incorporated herein in its entirety.

This application is related to co-pending commonly assigned US Patent Application Publication Number 2010/0161948, titled "APPARATUS AND METHOD FOR PROCESSING COMPLEX INSTRUCTION FORMATS IN A MULTITHREADED ARCHITECTURE SUPPORTING VARIOUS CONTEXT SWITCH MODES AND VIRTUALIZATION SCHEMES" by Mohammad A. Abdallah, filed on Nov. 14, 2007, and which is incorporated herein in its entirety.

FIELD OF THE INVENTION

The present invention is generally related to digital computer systems, more particularly, to a system and method for selecting instructions comprising an instruction sequence.

BACKGROUND OF THE INVENTION

Processors are required to handle multiple tasks that are either dependent or totally independent. The internal state of such processors usually consists of registers that might hold different values at each particular instant of program execution. At each instant of program execution, the internal state image is called the architecture state of the processor.

When code execution is switched to run another function (e.g., another thread, process or program), then the state of the machine/processor has to be saved so that the new function can utilize the internal registers to build its new state. Once the new function is terminated then its state can be discarded and the state of the previous context will be restored and execution resumes. Such a switch process is called a context switch and usually includes 10's or hundreds of cycles especially with modern architectures that employ large number of registers (e.g., 64, 128, 256) and/or out of order execution.

In thread-aware hardware architectures, it is normal for the hardware to support multiple context states for a limited number of hardware-supported threads. In this case, the hardware duplicates all architecture state elements for each supported thread. This eliminates the need for context switch when executing a new thread. However, this still has multiple draw backs, namely the area, power and complexity of duplicating all architecture state elements (i.e., registers) for each additional thread supported in hardware. In addition, if the number of software threads exceeds the number of explicitly supported hardware threads, then the context switch must still be performed.

This becomes common as parallelism is needed on a fine granularity basis requiring a large number of threads. The hardware thread-aware architectures with duplicate context-state hardware storage do not help non-threaded software code and only reduces the number of context switches for software that is threaded. However, those threads are usually constructed for coarse grain parallelism, and result in heavy software overhead for initiating and synchronizing, leaving fine grain parallelism, such as function calls and loops parallel execution, without efficient threading initiations/auto generation. Such described overheads are accompanied with the difficulty of auto parallelization of such codes using state of the art compiler or user parallelization techniques for non-explicitly/easily parallelized/threaded software codes.

SUMMARY OF THE INVENTION

In one embodiment, the present invention is implemented as a method for populating a register view data structure by using register template snapshots. The method includes receiving an incoming instruction sequence using a global front end; grouping the instructions to form instruction blocks; using a plurality of register templates to track instruction destinations and instruction sources by populating the register template with block numbers corresponding to the instruction blocks, wherein the block numbers corresponding to the instruction blocks indicate interdependencies among the blocks of instructions; populating a register view data structure, wherein the register view data structure stores destinations corresponding to the instruction blocks as recorded by the plurality of register templates; and using the register view data structure to track a machine state in accordance with the execution of the plurality of instruction blocks.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 24 shows another implementation of a scheduler using thread based pointer maps in accordance with one embodiment of the present invention.

DETAILED DESCRIPTION OF THE INVENTION

Figure 1:
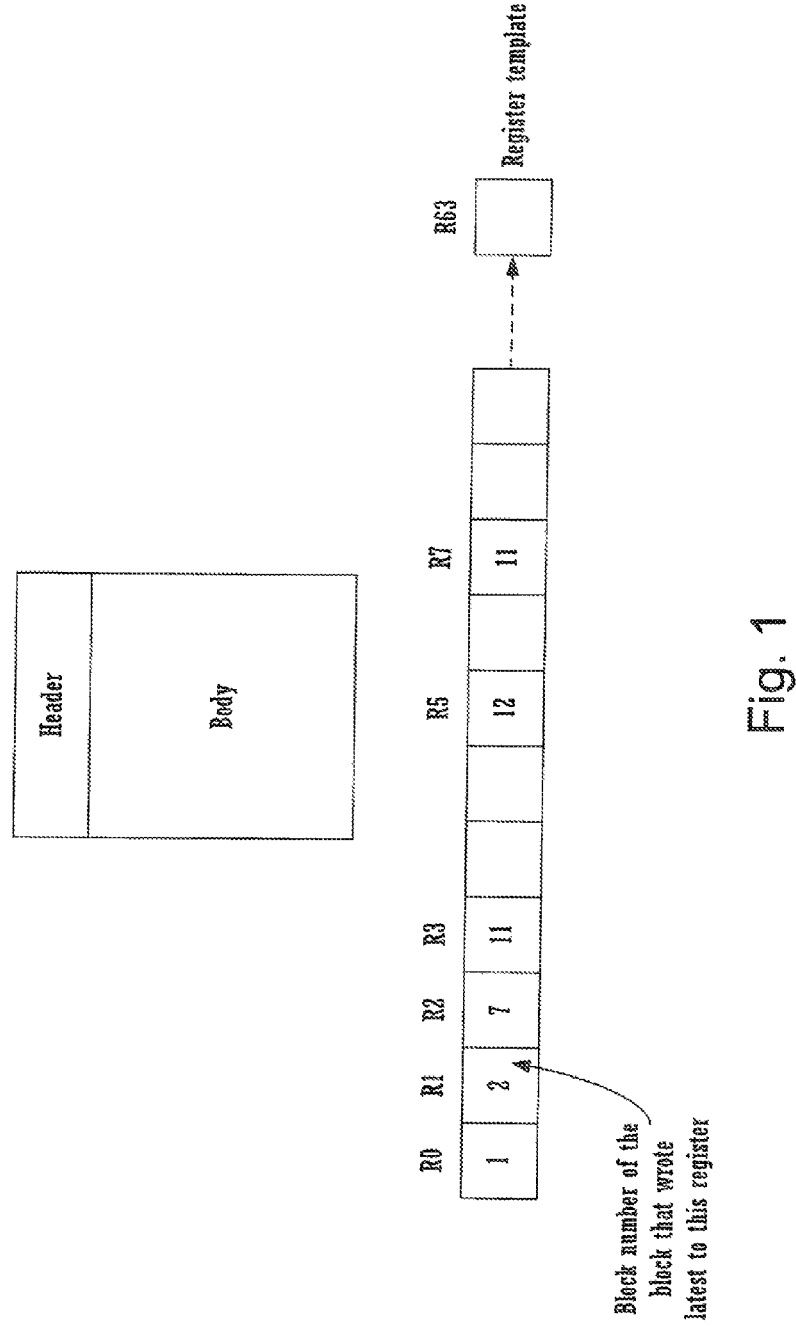
FIG. 1 shows an overview diagram of a process for grouping instructions into a block and tracking dependencies among the instructions by using a register template.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

FIG. 1 shows an overview diagram of a process for grouping instructions into a block and tracking dependencies among the instructions by using a register template.

FIG. 1 shows an instruction block having a header and a body. The block is created from a group of instructions. The block comprises an entity that encapsulates the group of instructions. In the present embodiment of the microprocessor, the level of abstraction is raised to blocks instead of individual instructions. Blocks are processed for dispatch instead of individual instructions. Each block is labeled with a block number. The machine's out of order management job is thereby greatly simplified. One key feature is to find a way to manage a larger number of instructions being processed without greatly increasing the management overhead of the machine.

Embodiments of the present invention achieves this objective by implementing instruction blocks, register templates and inheritance vectors. In the block shown in FIG. 1, the header of the block lists and encapsulates all the sources and destinations of the instructions of the block. The header includes the destinations that update the register template. The sources included in the header will be concatenated with the block numbers stored in the register template.

The number of instructions that are processed out of order determines the management complexity of the out of order machine. More out of order instructions leads to greater complexity. Sources need to compare against destinations of prior instructions in the out of order dispatch window of the processor.

As shown in FIG. 1, the register template has fields for each register from R0 to R63. Blocks write their respective block numbers into the register template fields that correspond to the block destinations. Each block reads the register fields that represent its register sources from the register template. When a block retires and writes its destination register contents into the register file, its number is erased from the register template. This means that those registers can be read as sources from the register file itself.

In the present embodiment, the register template is updated each cycle of the machine whenever a block is allocated. As new template updates are generated, prior snapshots of the register templates are stored into an array (e.g., the register view shown in FIG. 2), one per block. This information is retained until the corresponding block is retired. This allows the machine to recover from miss-predictions and flushes very quickly (e.g., by obtaining the last known dependency state).

In one embodiment, the register templates stored in the register view can be compressed (thereby saving storage space) by storing only the delta between successive snapshots (incremental changes between snapshots). In this manner the machine obtains a shrunk register view. Further compression can be obtained by only storing templates for blocks that have a branch instruction.

If a recovery point is needed other than a branch miss-prediction, then a recovery is first obtained at the branch recovery point, then state can be rebuilt out of allocating instructions (but not executing them) until the machine reaches the sought after recovery point.

It should be noted that in one embodiment, the term "register template" as used herein is synonymous with the term "inheritance vectors" as described in the earlier filed commonly assigned patent application "EXECUTING INSTRUCTION SEQUENCE CODE BLOCKS BY USING VIRTUAL CORES INSTANTIATED BY PARTITION-ABLE ENGINES" by Mohammad Abdallah, filed on Mar. 23, 2012, Ser. No. 13/428,440, which is incorporated herein in its entirety.

Figure 2:
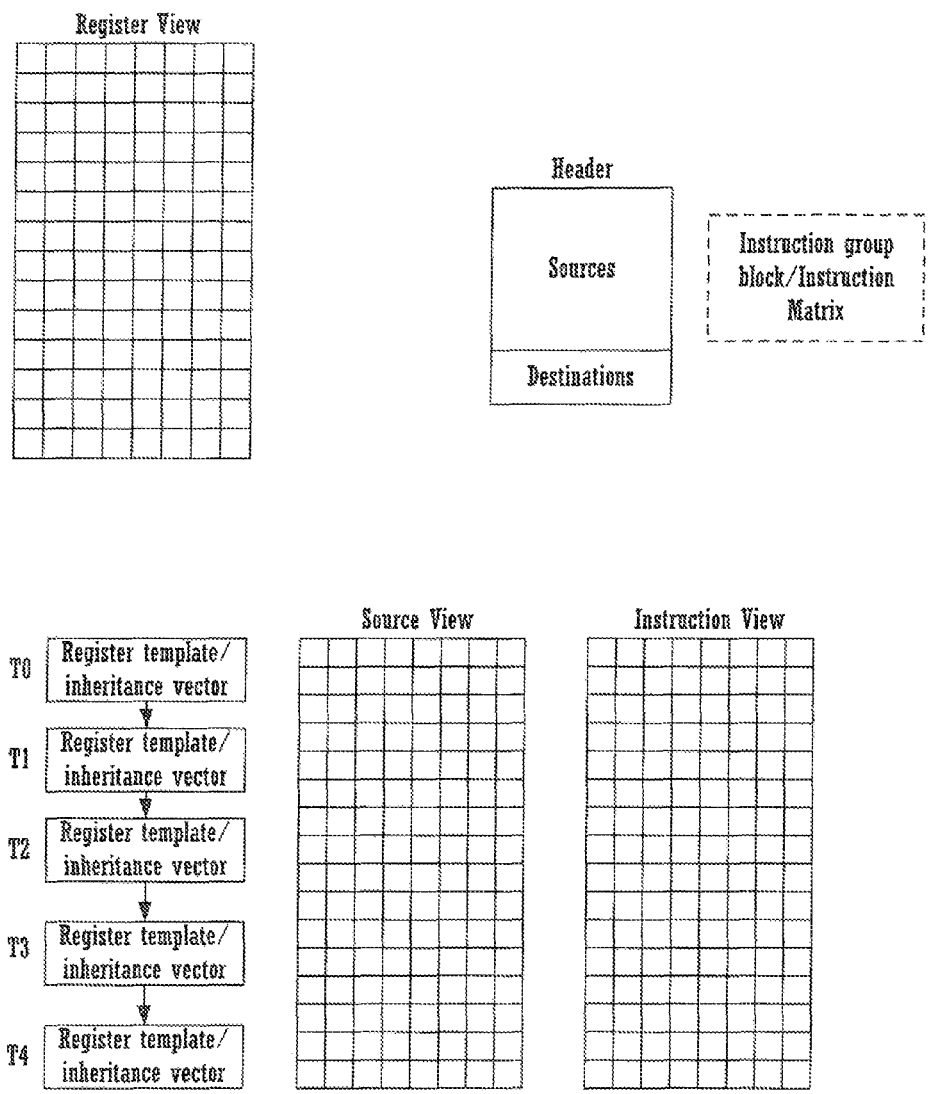
FIG. 2 shows an overview diagram of a register view, a source view, and an instruction view in accordance with one embodiment of the present invention.

FIG. 2 shows an overview diagram of a register view, a source view, and an instruction view in accordance with one embodiment of the present invention. This figure shows one embodiment of a scheduler architecture (e.g., having a source view, instruction view, register view, etc.). Other implementations of a scheduler architecture that achieves the same functionality by combining or splitting one or more of the above cited structures are possible.

FIG. 2 diagrams the functional entities supporting the operation of the register templates and retention of the machine state. The left-hand side of FIG. 2 shows register templates T0 through T4, with the arrows indicating the inheritance of information from one register template/inheritance vector to the next. The register view, source view, and instruction view each comprise data structures for storing information which relates to the blocks of instructions. FIG. 2 also shows an exemplary instruction block having a header and how the instruction block includes both sources and destinations for the registers of the machine. Information about the registers referred to by the blocks is stored in the register view data structure. Information about the sources referred to by the blocks is stored in the source view data structure. Information about the instructions themselves referred to by the blocks is stored in the instruction view data structure. The register templates/inheritance vectors themselves comprise data structures storing dependency and inheritance information referred to by the blocks.

Figure 3:
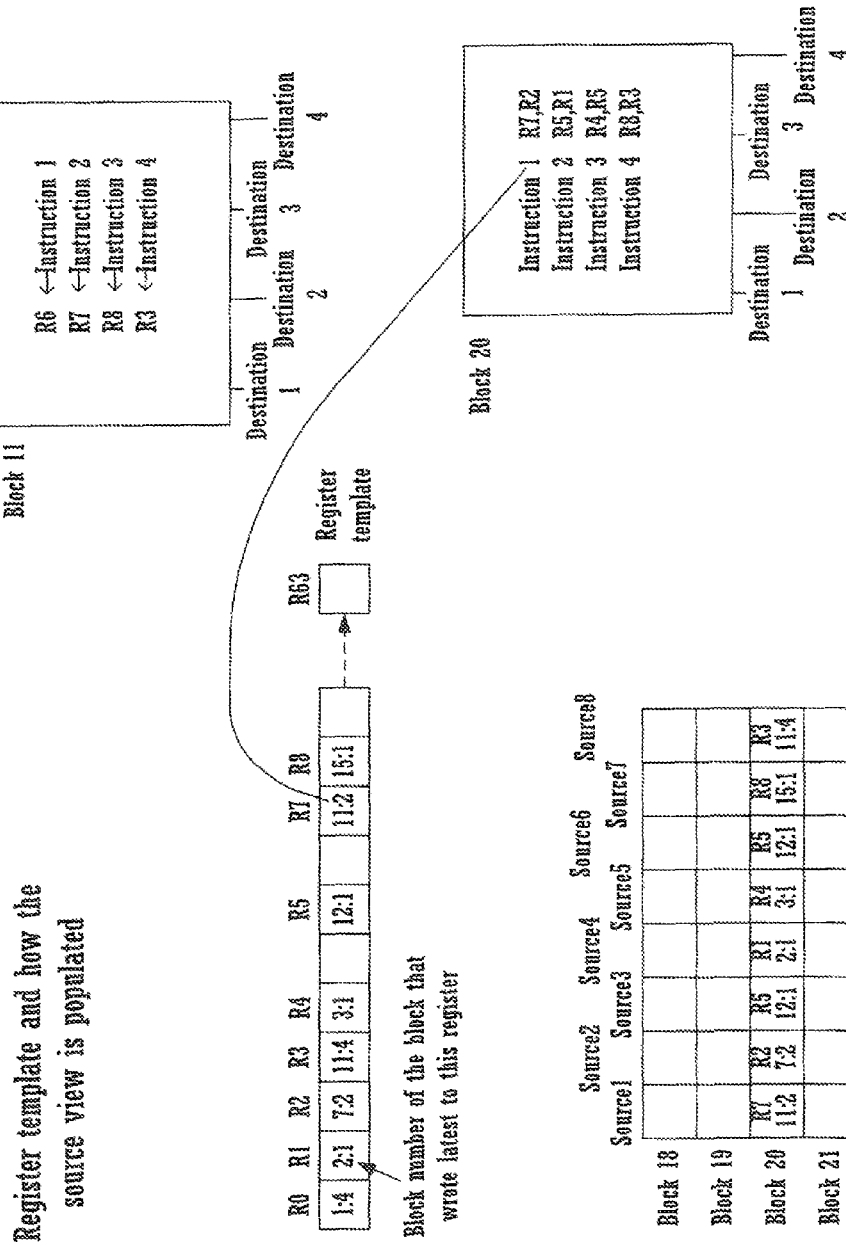
FIG. 3 shows a diagram that illustrates an exemplary register template and how the source view is populated by information from the register template in accordance with one embodiment of the present invention.

FIG. 3 shows a diagram that illustrates an exemplary register template and how the source view is populated by information from the register template in accordance with one embodiment of the present invention.

In the present embodiment, it should be noted that the goal of the source view is to determine when particular blocks can be dispatched. When a block is dispatched it broadcasts its block number to all remaining blocks. Any matches in the source view for the block number (e.g., a compare) causes a ready bit (e.g., or some other type of indicator) to be set. When all ready bits are set (e.g., AND gate) the block is ready to be dispatched. Blocks are dispatched based on the readiness of other blocks they depend on.

When multiple blocks are ready for dispatch, the oldest block is chosen for dispatch ahead of younger blocks. For example, in one embodiment a find first circuit can be used to find the oldest block based on proximity to a commit pointer and subsequent blocks based on relative proximity to the commit pointer (e.g., working on each block's ready bit).

Referring still to FIG. 3, in this example, the register template snapshot created at the arrival of block 20 is being examined. As described above, the register template has fields for each register from R0 to R63. Blocks write their respective block numbers into the register template fields that correspond to the block destinations. Each block reads the register fields that represent its register sources from the register template. The first number is the block that wrote to the register and the second number is the destination number of that block (which also corresponds to instruction number as shown in FIG. 3).

For example, when block 20 arrives, it reads the register template and looks up its own register sources in the register template to determine the latest block that wrote to each of its sources and populate the source view according to the updates that prior blocks' destinations (e.g., block 11, as shown in FIG. 3) make to the register template. Subsequent blocks will update the register template with their own destinations. This is shown in the bottom left of FIG. 3, where block 20 populates its sources: source 1, source 2, source 3, all the way to source 8.

Figure 4:
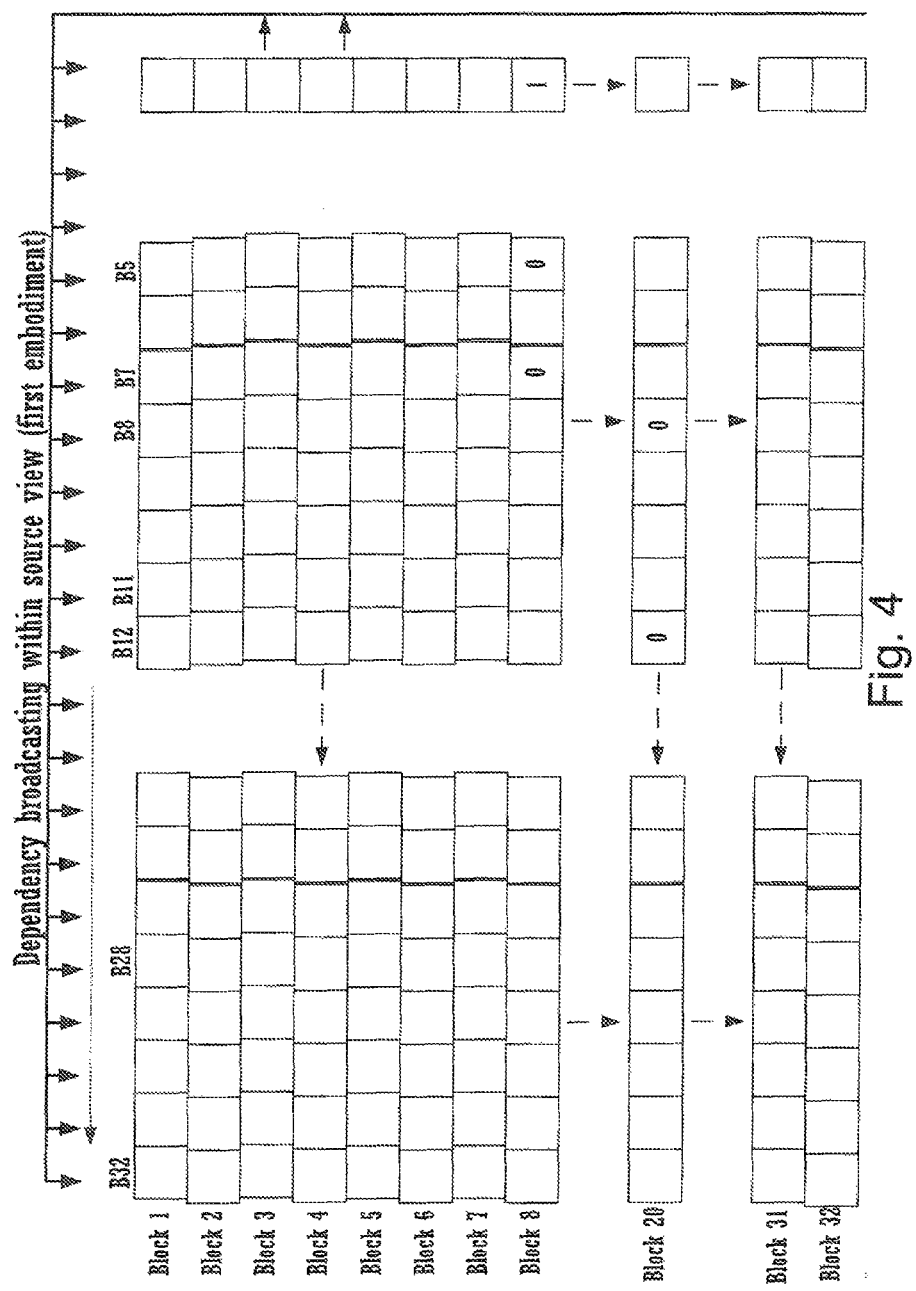
FIG. 4 shows a diagram illustrating a first embodiment for dependency broadcasting within source view. In this embodiment, each column comprises an instruction block.

FIG. 4 shows a diagram illustrating a first embodiment for dependency broadcasting within source view. In this embodiment, each column comprises an instruction block. When a block is allocated it marks (e.g., by writing 0) in all the block's columns where ever its sources have dependency on those blocks. When any other block is dispatched its number is broadcasted across the exact column that relates to that block. It should be noted that writing a 1 is the default value indicating that there is no dependency on that block.

When all ready bits in a block are ready, that block is dispatched and its number is broadcast back to all the remaining blocks. The block number compares against all the numbers stored in the sources of the other blocks. If there is a match, the ready bit for that source is set. For example, if the block number broadcasted on source 1 equals 11 then the ready bit for source 1 of block 20 will be set.

Figure 5:
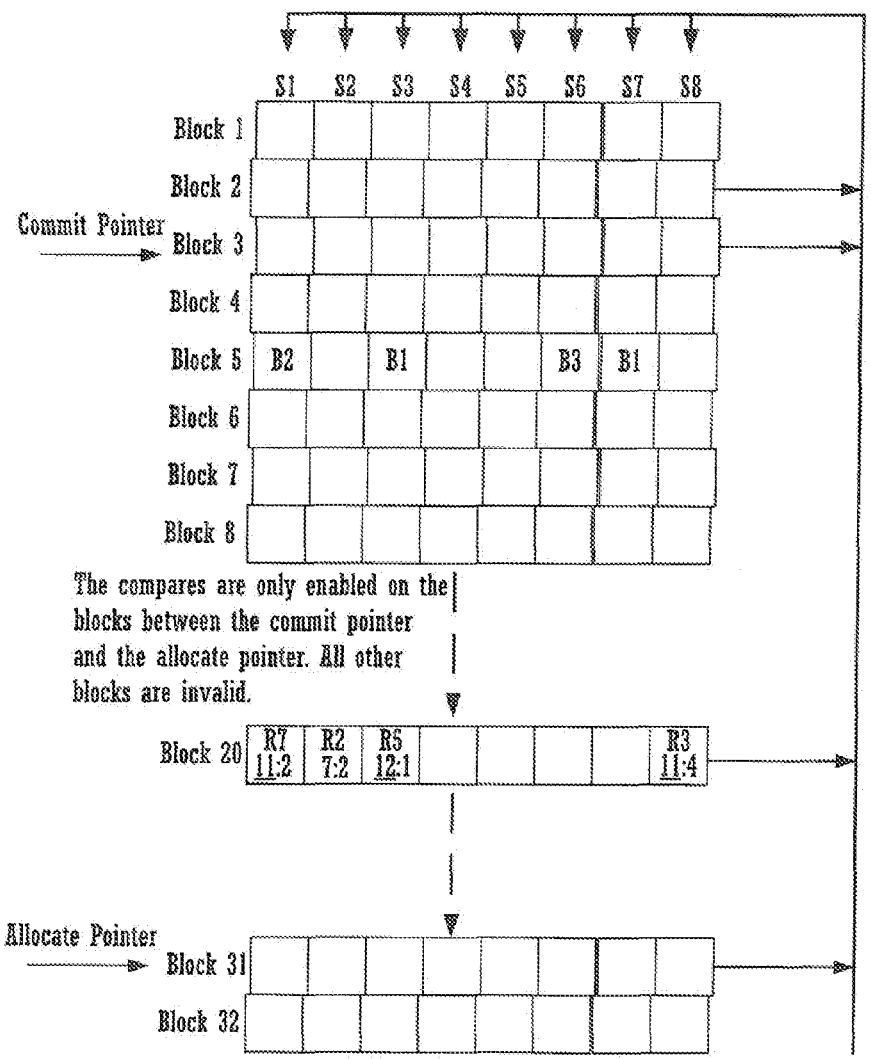
FIG. 5 shows a diagram illustrating a second embodiment for dependency broadcasting within source view.

FIG. 5 shows a diagram illustrating a second embodiment for dependency broadcasting within source view. This embodiment is organized by sources as opposed to being organized by blocks. This is shown by the sources S1 through S8 across the source view data structure. In a manner similar to as described with FIG. 4 above, in the FIG. 5 embodiment, when all ready bits in a block are ready, that block is dispatched and its number is broadcast back to all the remaining blocks. The block number compares against all the numbers stored in the sources of the other blocks. If there is a match, the ready bit for that source is set. For example, if the block number broadcasted on source 1 equals 11 then the ready bit for source 1 of block 20 will be set.

The FIG. 5 embodiment also shows how the compares are only enabled on the blocks between the commit pointer and the allocate pointer. All other blocks are invalid.

Figure 6:
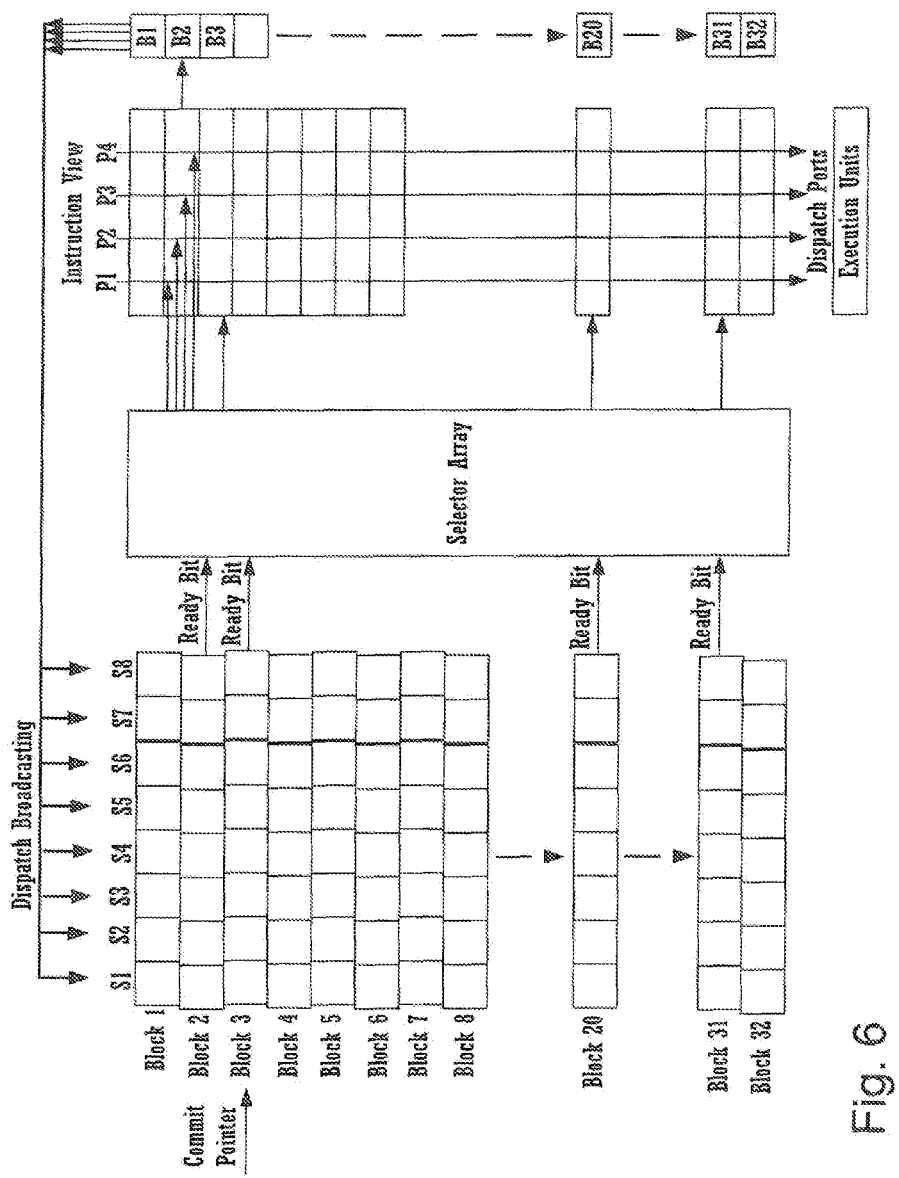
FIG. 6 shows a diagram illustrating the selection of ready blocks for dispatch starting from the commit pointer and broadcasting the corresponding port assignments in accordance with one embodiment of the present invention.

FIG. 6 shows a diagram illustrating the selection of ready blocks for dispatch starting from the commit pointer and broadcasting the corresponding port assignments in accordance with one embodiment of the present invention. The source view data structure is shown on the left-hand side of FIG. 6. The instruction view data structure is shown on the right-hand side of FIG. 6. A selector array is shown between the source view and the instruction view. In this embodiment, the selector array dispatches four blocks per cycle via the four dispatch ports P1 through P4.

As described above, blocks are selected for dispatch from the commit pointer wrapping around to allocate pointer (e.g., trying to honor dispatching older blocks first). The selector array is used to find the first 4 ready blocks starting from the commit pointer. It is desired to dispatch the oldest ready blocks. In one embodiment, the selector array can be implemented by using an adder tree structure. This will be described in FIG. 7 below.

FIG. 6 also shows how the selector array is coupled to each of the four ports that passed through the entries in the instruction view. In this embodiment, the port couplings as port enables, and enable one of the four ports to be activated and for that instruction view entry to pass through down to the dispatch port and on to the execution units. Additionally, as described above, dispatched blocks are broadcast back through the source view. The block numbers of selected blocks for dispatch are broadcast back (up to 4). This is shown on the far right-hand side of FIG. 6.

Figure 7:
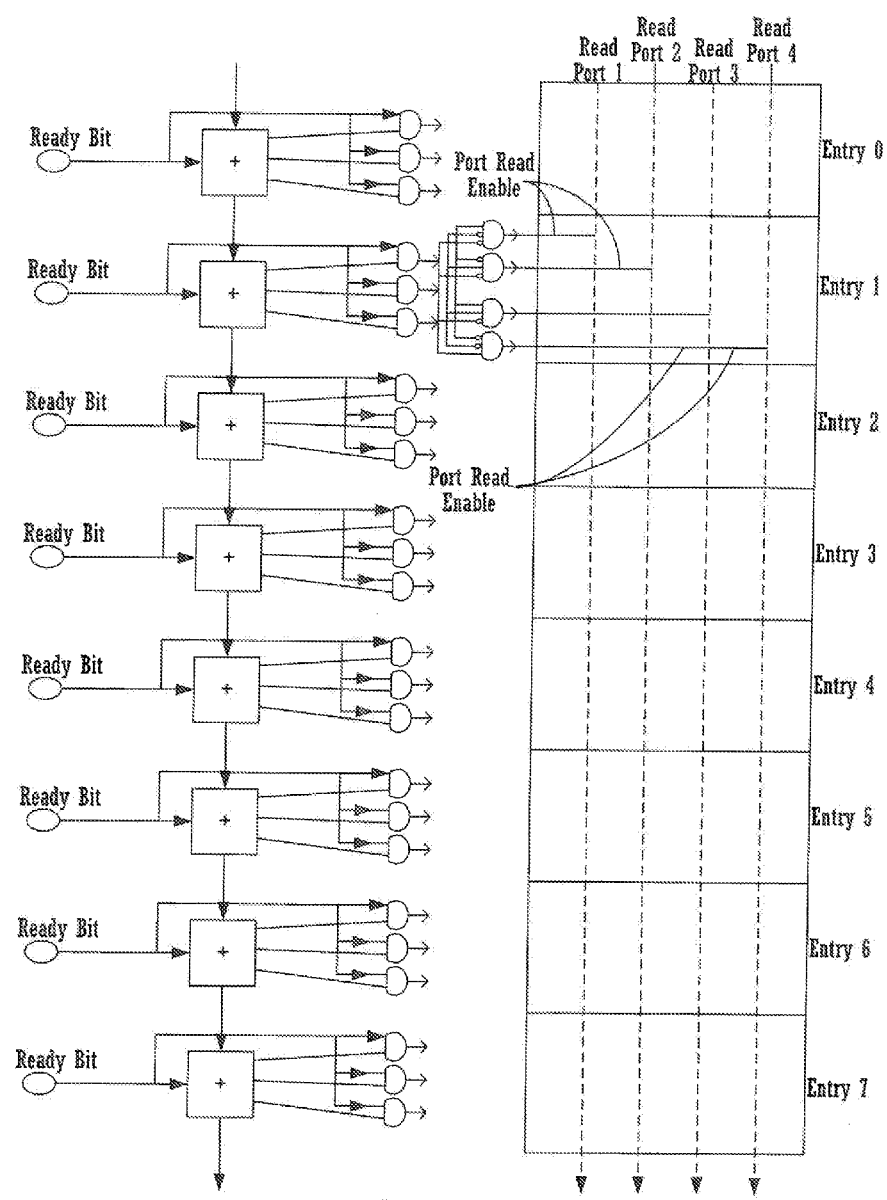
FIG. 7 shows an adder tree structure that is used to implement the selector array described in FIG. 6 in accordance with one embodiment of the present invention.

FIG. 7 shows an adder tree structure that is used to implement the selector array described in FIG. 6 in accordance with one embodiment of the present invention. The depicted adder tree implements the functionality of the selector array. The adder tree picks the first four ready blocks and mounts them to the four available ports for dispatch (e.g., read port 1 through read port 4). No arbitration is used. The actual logic that is used to specifically enable a specific port is explicitly shown in entry number 1. For the sake of clarity, the logic is not specifically show in the other entries. In this manner, FIG. 7 shows one specific embodiment of how the direct selection of each particular port for block dispatch is implemented. It should be noted however, that alternatively, an embodiment that uses priority encoders can be implemented.

Figure 8:
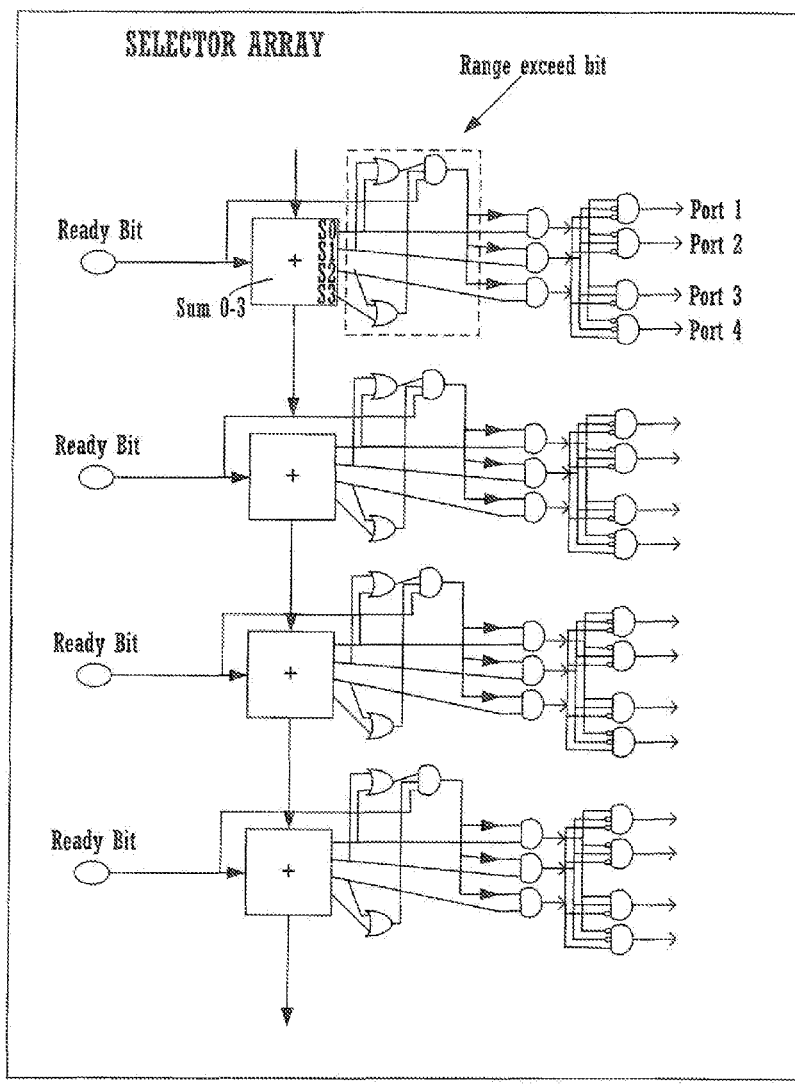
FIG. 8 shows exemplary logic of a selector array adder tree in greater detail.

FIG. 8 shows exemplary logic of a selector array adder tree in greater detail. In the FIG. 8 embodiment, logic is shown for a range exceed bit. The range exceed bit ensures that no more than four blocks will be selected for dispatch if a fifth block is ready the range exceed bit will not allow it to be dispatched if the first four also ready. It should be noted that the sum bits are S 0 to S 3 are both used to enable the dispatch port as well as propagation to the next adder stage in the serial implementation.

Figure 9:
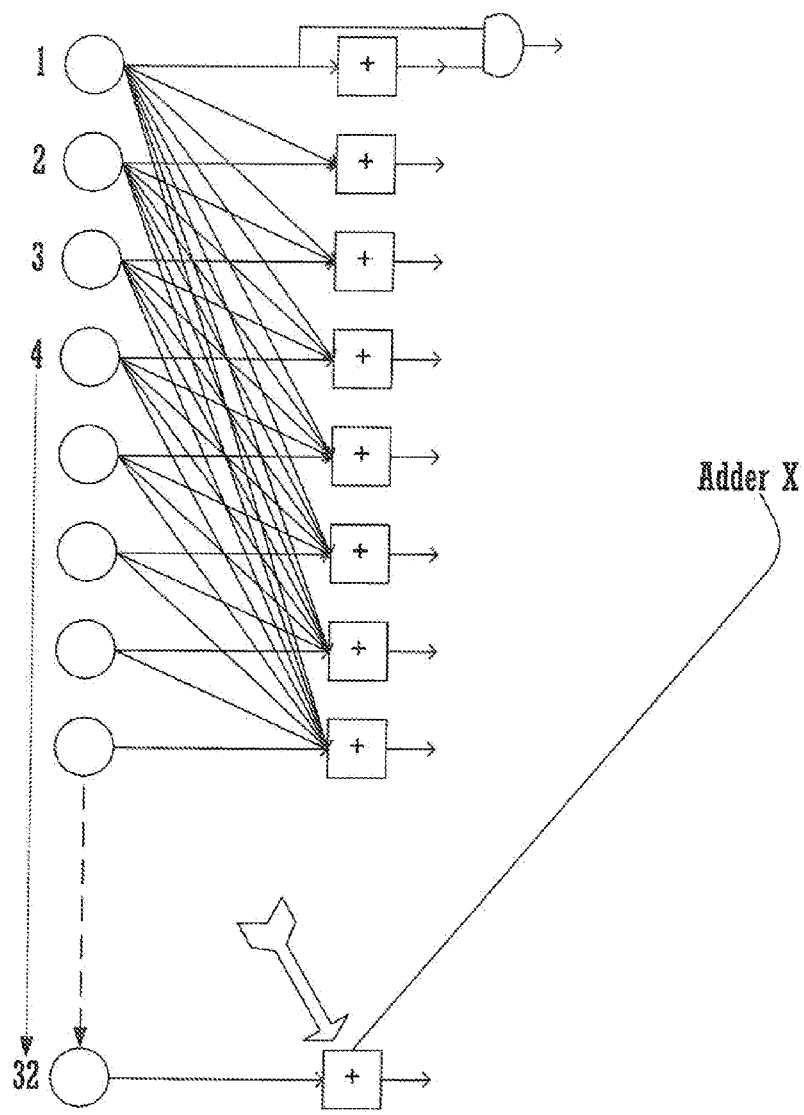
FIG. 9 shows a parallel implementation of the adder tree for implementing a selector array in accordance with one embodiment of the present invention.

FIG. 9 shows a parallel implementation of the adder tree for implementing a selector array in accordance with one embodiment of the present invention. The parallel implementation does not forward the sum from each adder to the next. In the parallel implementation, each adder uses all its necessary inputs directly using a multiple input addition implementation, such as multi-input carry save adder trees. For example, the adder "X" sums all of the previous inputs. This parallel implementation is desirable in order to execute faster compute times (e.g., single cycle).

Figure 10:
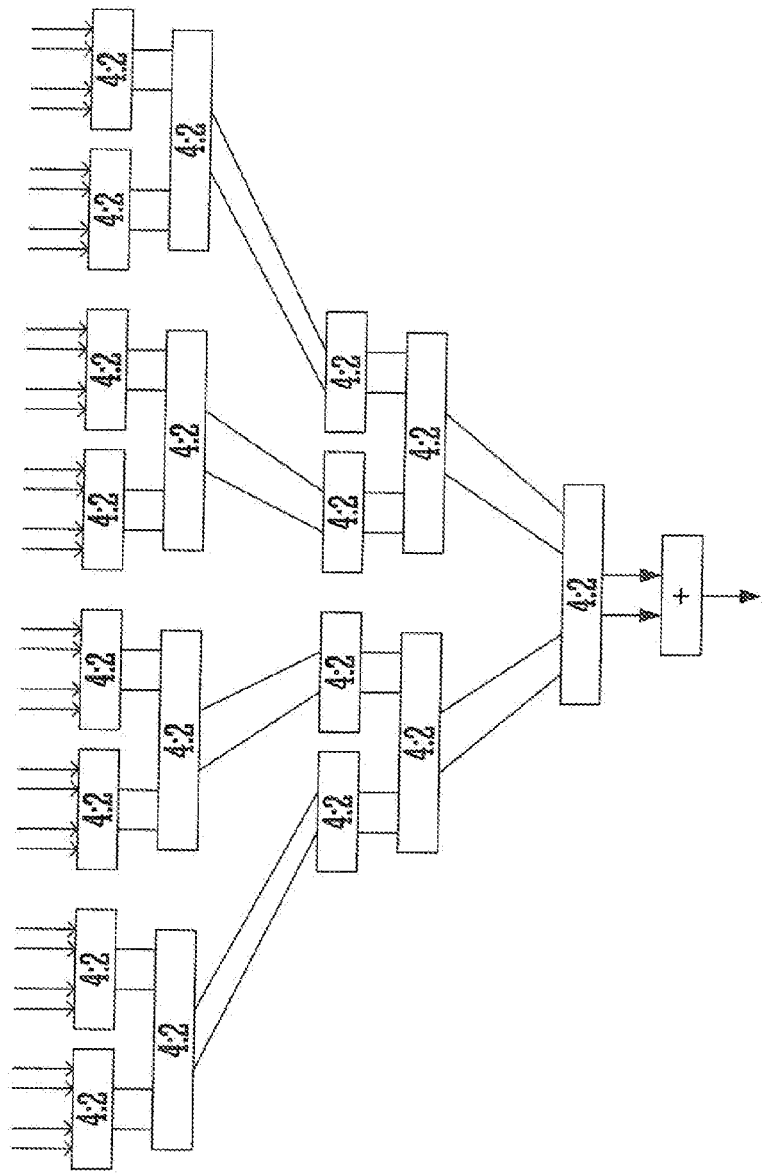
FIG. 10 shows an exemplary diagram illustrating how adder X from FIG. 9 can be implemented by using carry save adders in accordance with one embodiment of the present invention.

FIG. 10 shows an exemplary diagram illustrating how adder X from FIG. 9 can be implemented by using carry save adders in accordance with one embodiment of the present invention. FIG. 10 shows a structure that can add 32 inputs in a single cycle. The structure is put together using 4-by-2 carry save adders.

Figure 11:
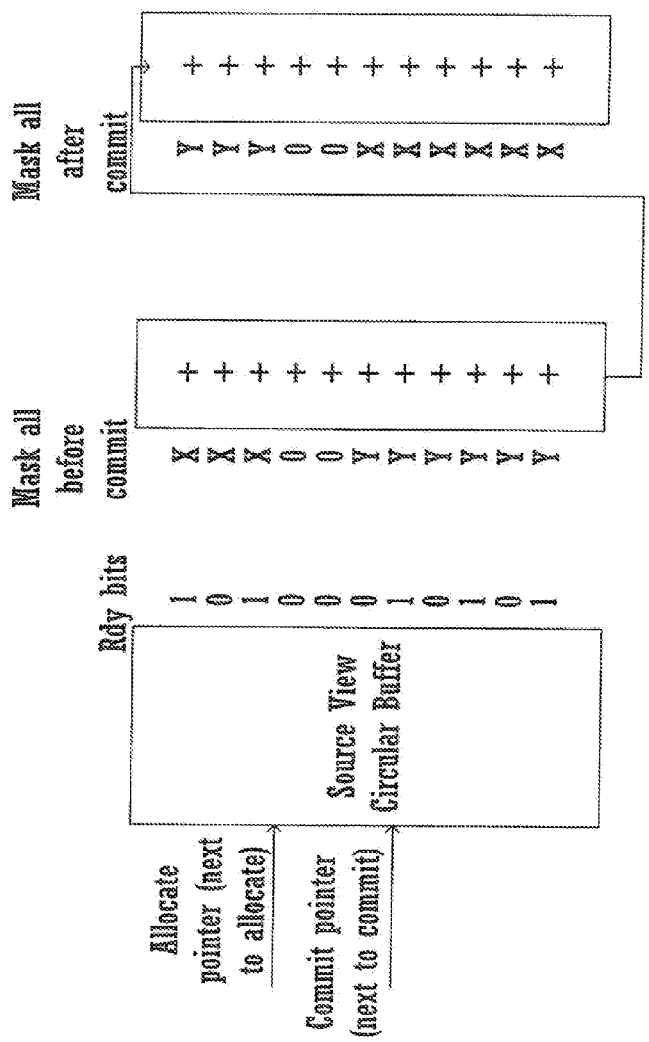
FIG. 11 shows a masking embodiment for masking ready bits for scheduling starting from the commit pointer and using the selector array adders in accordance with of the present invention.

FIG. 11 shows a masking embodiment for masking ready bits for scheduling starting from the commit pointer and using the selector array adders in accordance with of the present invention. In this implementation, the selector array adders are trying to select first 4 ready blocks to dispatch starting from the commit pointer potentially wrapping around to the allocate pointer. In this implementation, multi-input parallel adders are used. Additionally, in this implementation a source of these circular buffer is utilized.

FIG. 11 shows how the ready bits are ANDed together with each of the two masks (individually or separately) and applied to the two adder trees in parallel. The first four are selected by using the two adder trees and comparing against the threshold of four. The "X" marks denote "exclude from the selection array for that adder tree" thus the "X" value is zero. On the other hand the "Y" marks denote "do include in the selection array for that adder tree" thus the "Y" value is one.

Figure 12:
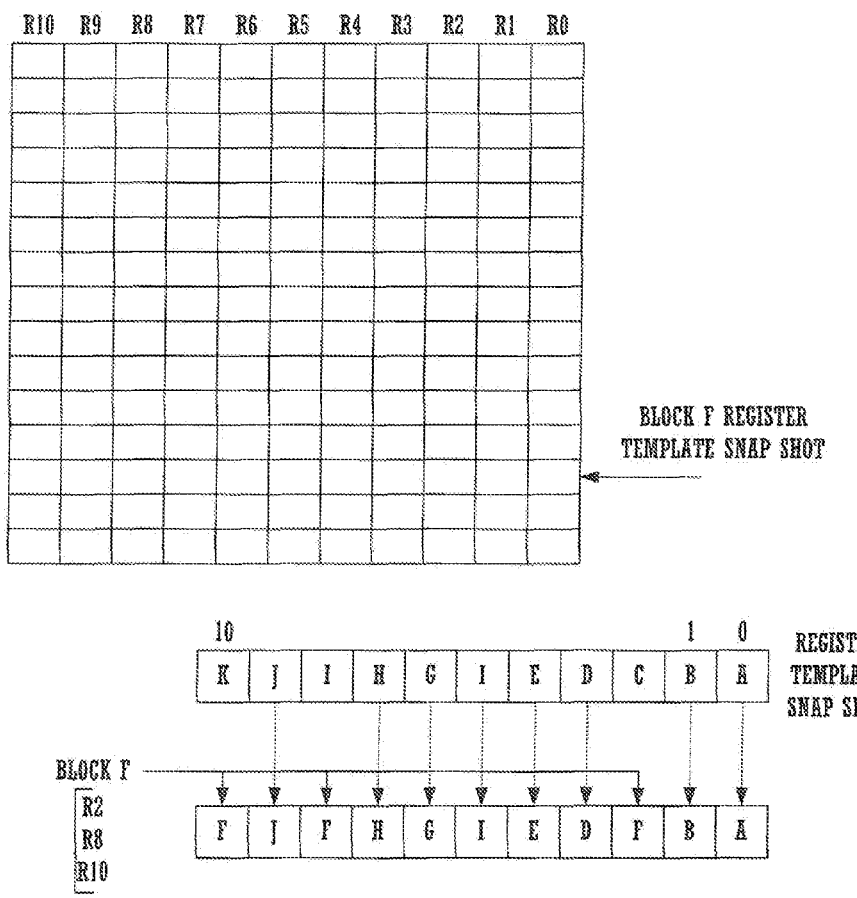
FIG. 12 shows an overview diagram of how register view entries are populated by register templates in accordance with one embodiment of the present invention.

FIG. 12 shows an overview diagram of how register view entries are populated by register templates in accordance with one embodiment of the present invention.

As described above, register view entries are populated by register templates. The register view stores snapshots of register templates for each block in sequence. When a speculation is not valid (e.g., a branch miss-prediction), the register view has a latest valid snapshot before the invalid speculation point. The machine can roll back its state to the last valid snapshot by reading that register view entry and loading it into the base of the register template. Each entry of register view shows all of the register inheritance states. For example in the FIG. 12 embodiment, if the register view for block F is invalid, the machine state can be rolled back to an earlier last valid register template snapshot.

Figure 13:
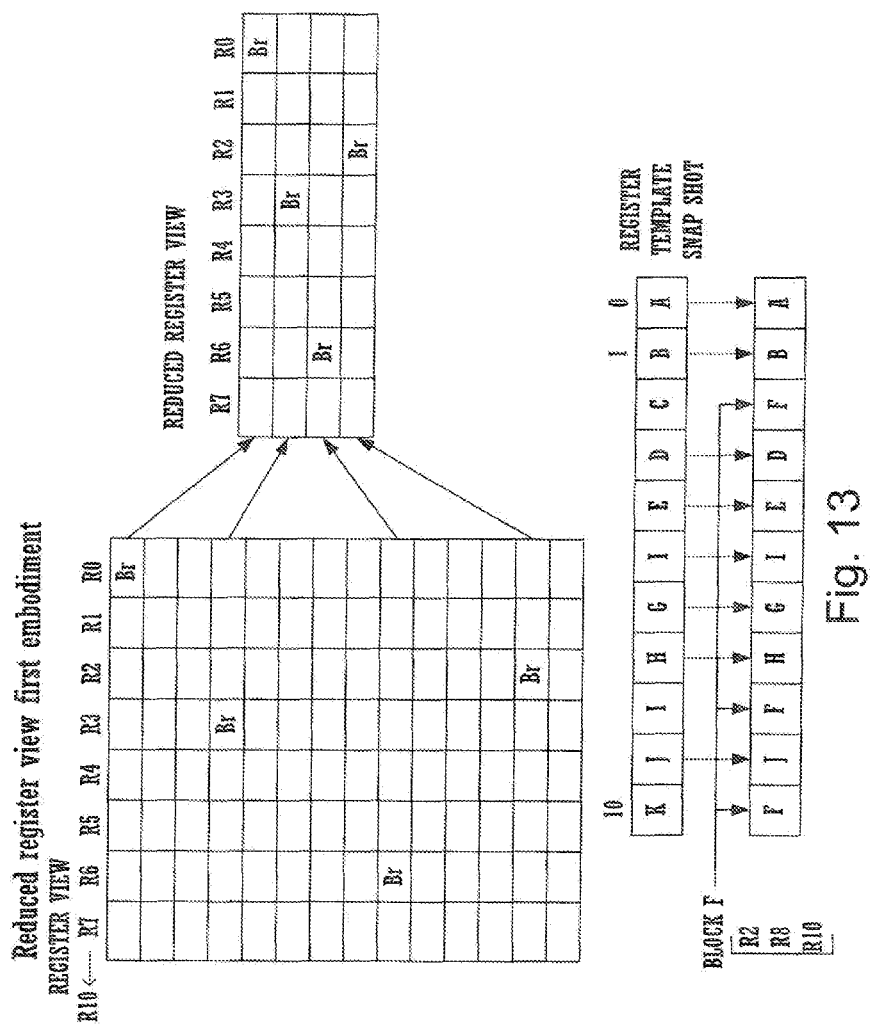
FIG. 13 shows a first embodiment for reduced register view footprint in accordance with one embodiment of the present invention.

FIG. 13 shows a first embodiment for reduced register view footprint in accordance with one embodiment of the present invention. The amount of memory needed to store the register view entries can be reduced by only storing those register view template snapshots that contain branch instructions. When an exception occurs (e.g., a speculation is not valid, a branch miss-prediction, etc.), the last valid snapshot can be rebuilt from the branch instruction that occurred prior to the exception. Instructions are fetched from the branch prior to the exception down to the exception in order to build the last valid snapshot. The instructions are fetched but they are not executed. As shown in FIG. 13, only those snapshots that include branch instructions are saved in the reduced register view. This greatly reduces the amount of memory needed to store the register template snapshots.

Figure 14:
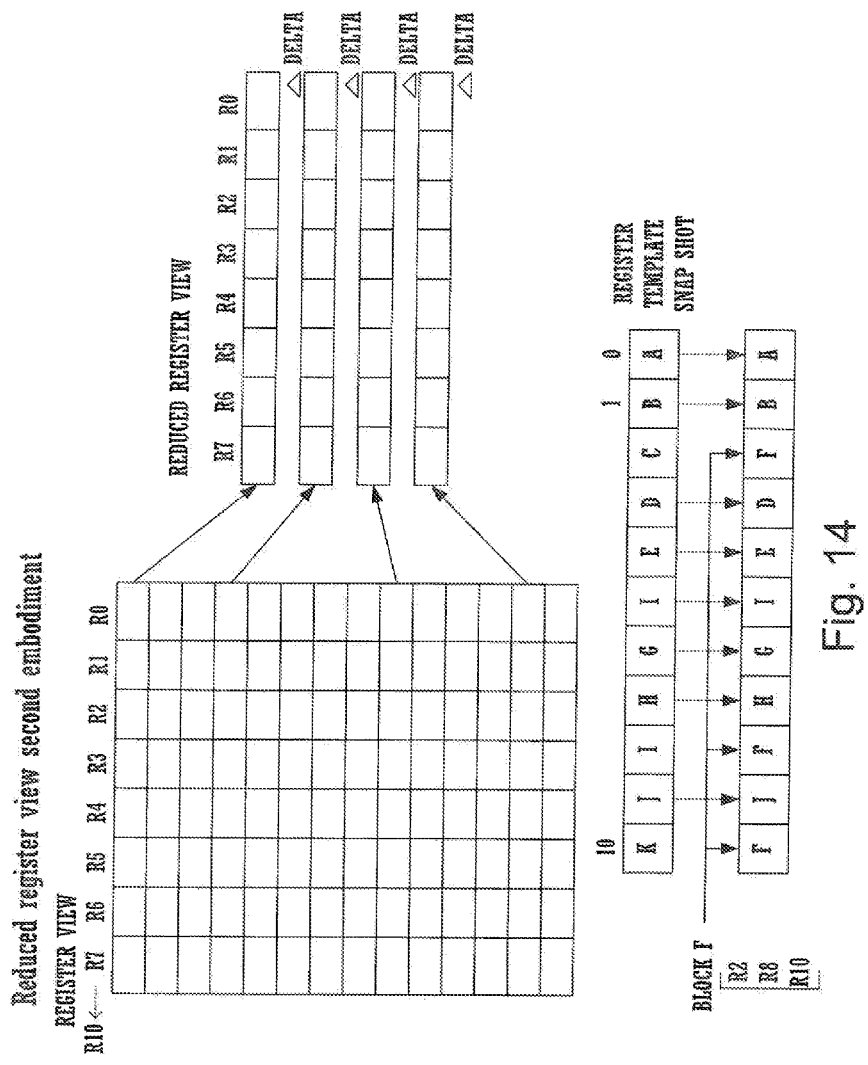
FIG. 14 shows a second embodiment for reduced register footprint in accordance with one embodiment of the present invention.

FIG. 14 shows a second embodiment for reduced register footprint in accordance with one embodiment of the present invention. The amount of memory needed to store the register view entries can be reduced by only storing a sequential subset of the snapshots (e.g., one out of every four snapshots). The change between successive snapshots can be stored as a "delta" from an original snapshot using a comparatively smaller amount of memory than full successive snapshots. When an exception occurs (e.g., a speculation is not valid, a branch miss-prediction, etc.), the last valid snapshot can be rebuilt from the original snapshot that occurred prior to the exception. The "delta" from the original snapshot that occurred prior to the exception and the successive snapshots are used to rebuild the last valid snapshot. The initial original state can accumulate deltas to arrive to the state of the required snapshot.

Figure 15:
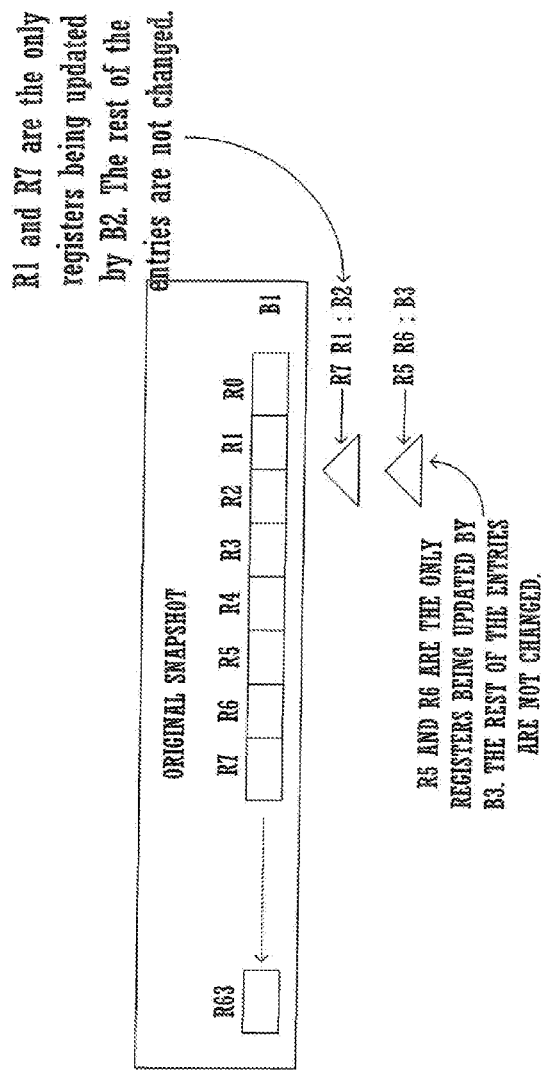
FIG. 15 shows an exemplary format of the delta between snapshots in accordance with one embodiment of the present invention.

FIG. 15 shows an exemplary format of the delta between snapshots in accordance with one embodiment of the present invention. FIG. 15 shows an original snapshot and two deltas. In one delta, R5 and R6 are the only registers being updated by B3. The rest of the entries are not changed. In another Delta, R1 and R7 are the only registers being updated by B2. The rest of the entries are not changed.

Figure 16:
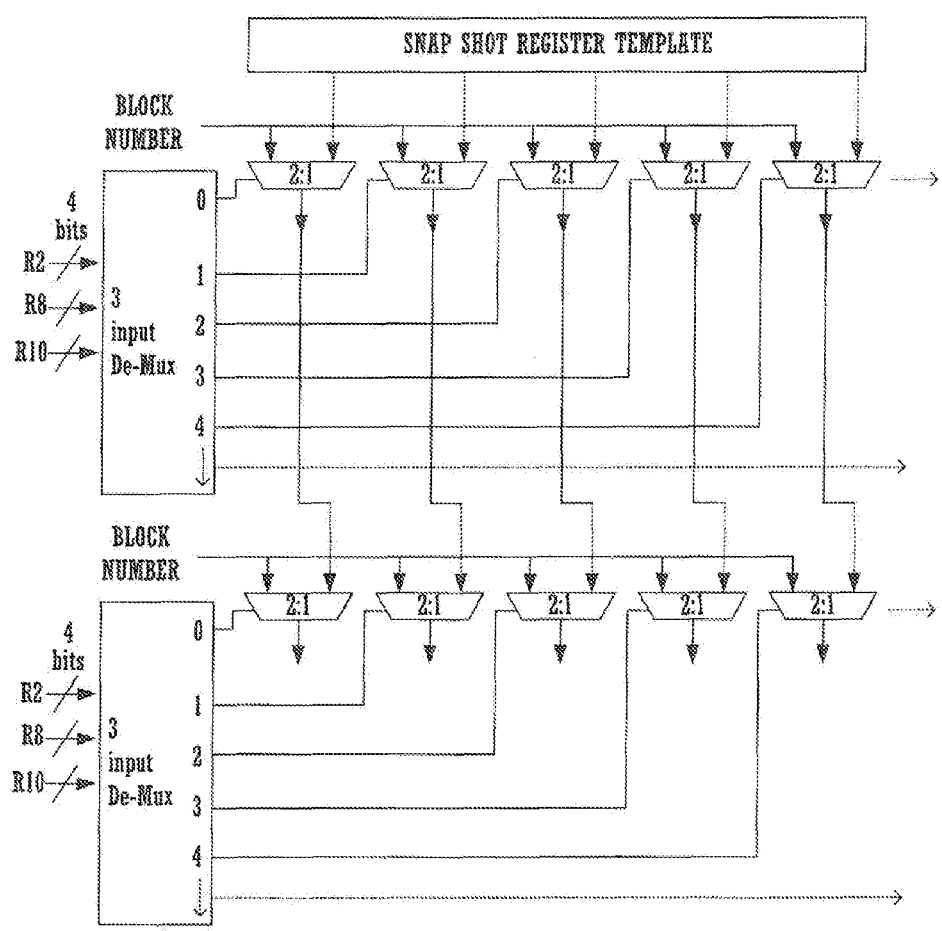
FIG. 16 shows a diagram of a process for creating register template snapshots upon allocations of blocks of instructions in accordance with one embodiment of the present invention.

FIG. 16 shows a diagram of a process for creating register template snapshots upon allocations of blocks of instructions in accordance with one embodiment of the present invention. In this embodiment, the left-hand side of FIG. 16 shows two de-multiplexers and at the top of FIG. 16 is a snapshot register template. FIG. 16 shows a diagram for creating a subsequent register template from a previous register template (e.g., a serial implementation).

This serial implementation shows how register template snapshots are created upon allocation of blocks of instructions. Those snapshots serves to capture the latest register architectural states update that are used for dependency tracking (e.g., as described in FIGS. 1 through 4) as well as updating the register view for handling miss-predictions/exceptions (e.g., as described in FIGS. 12 through 15).

The de-mux functions by selecting which incoming source is passed on. For example, register R2 will de-mux to a 1 at the second output, while R8 will de-mux to a 1 at the seventh output, and so on.

Figure 17:
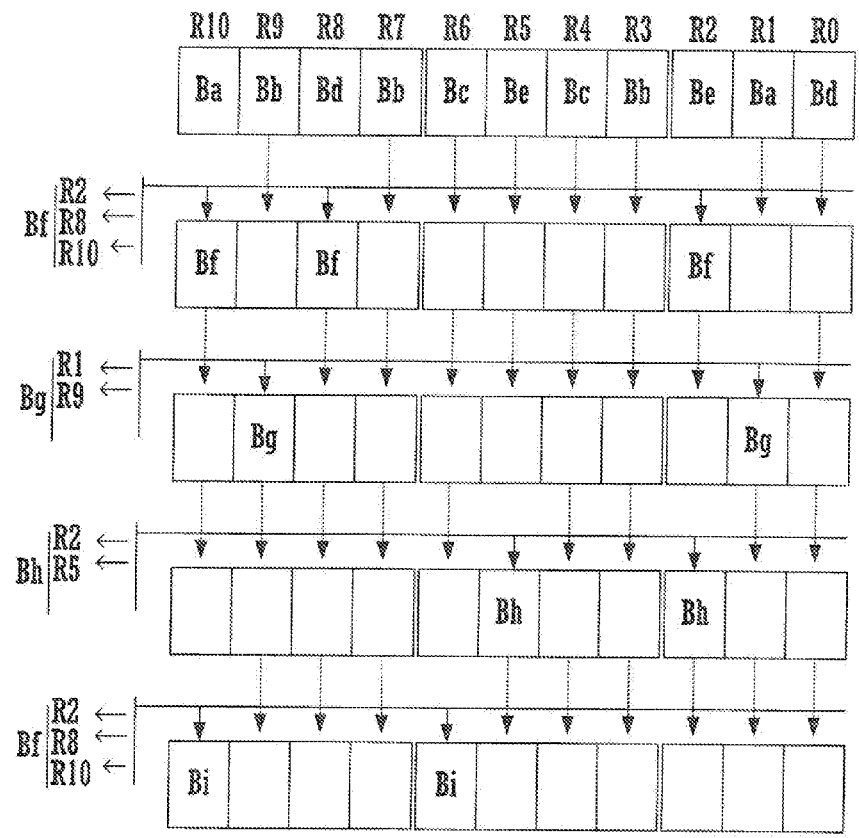
FIG. 17 shows another diagram of a process for creating register template snapshots upon allocations of blocks of instructions in accordance with one embodiment of the present invention.

FIG. 17 shows another diagram of a process for creating register template snapshots upon allocations of blocks of instructions in accordance with one embodiment of the present invention. The FIG. 17 embodiment also shows the creating of a subsequent register template from a previous register template. The FIG. 17 embodiment also shows an example of register template block inheritance. This Figure shows an example of how the register template is updated from allocated block numbers. For example, block Bf updates R2, R8, and R10. Bg updates R1 and R9. The dotted arrows indicate that the values are inherited from the prior snapshot. This process proceeds all the way down to block Bi. Thus, for example, since no snapshot updated register R7, its original value Bb will have propagated all the way down.

Figure 18:
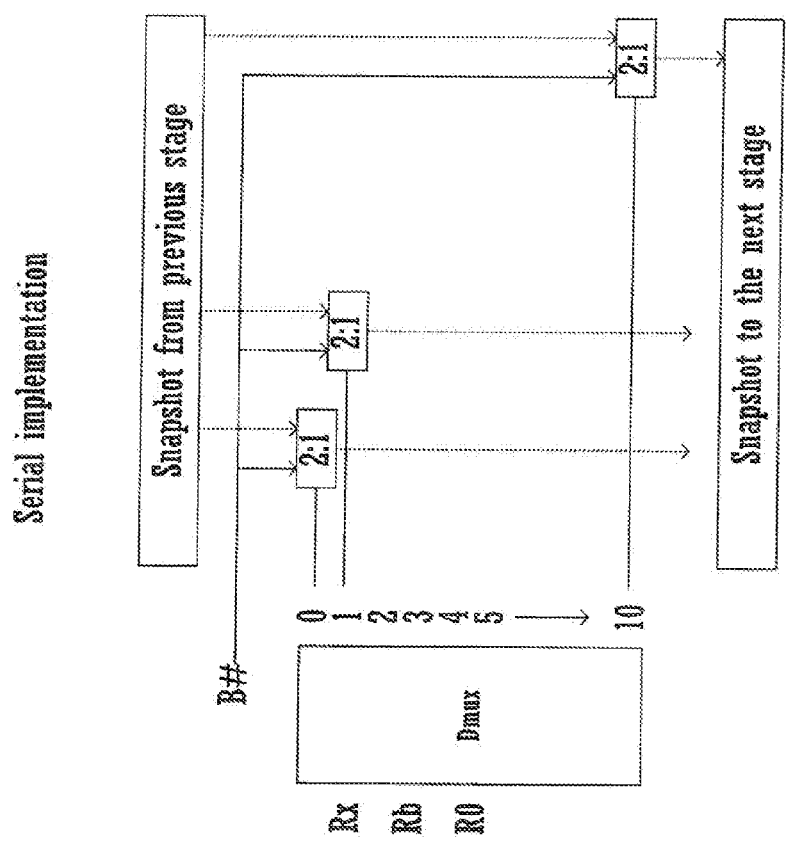
FIG. 18 shows an overview diagram of hardware for implementing the serial implementation of creating a subsequent register template from a previous register template in accordance with one embodiment of the present invention.

FIG. 18 shows an overview diagram of hardware for implementing the serial implementation of creating a subsequent register template from a previous register template in accordance with one embodiment of the present invention. The de-multiplexer is used to control a series of two input multiplexers which of two block numbers will be propagated down to the next stage. It can either be the block number from the previous stage or the current block number.

Figure 19:
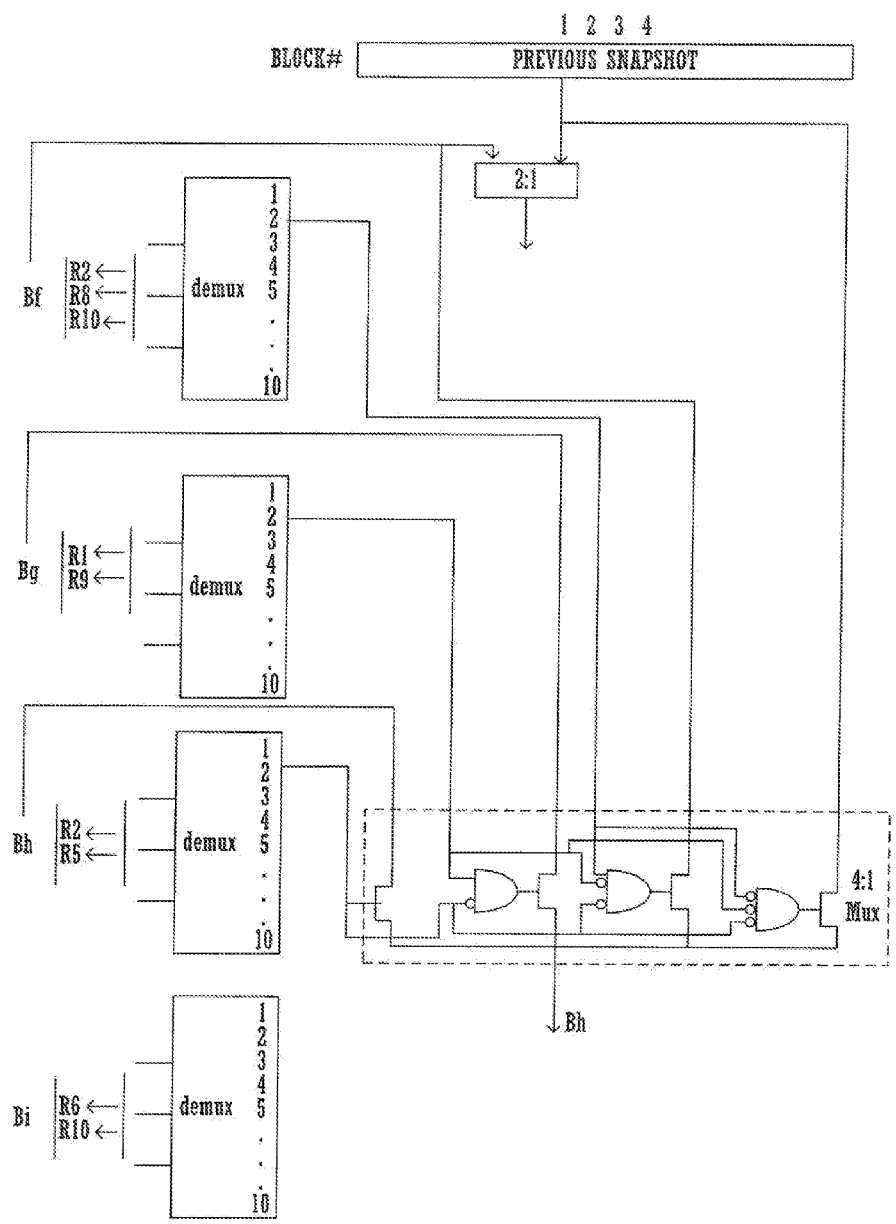
FIG. 19 shows an overview diagram of hardware for implementing a parallel implementation of creating a subsequent register template from a previous register template in accordance with one embodiment of the present invention.

FIG. 19 shows an overview diagram of hardware for implementing a parallel implementation of creating a subsequent register template from a previous register template in accordance with one embodiment of the present invention. This Parallel implementation uses special encoded multiplexer controls to create a subsequent register template from a previous register template.

Figure 20:
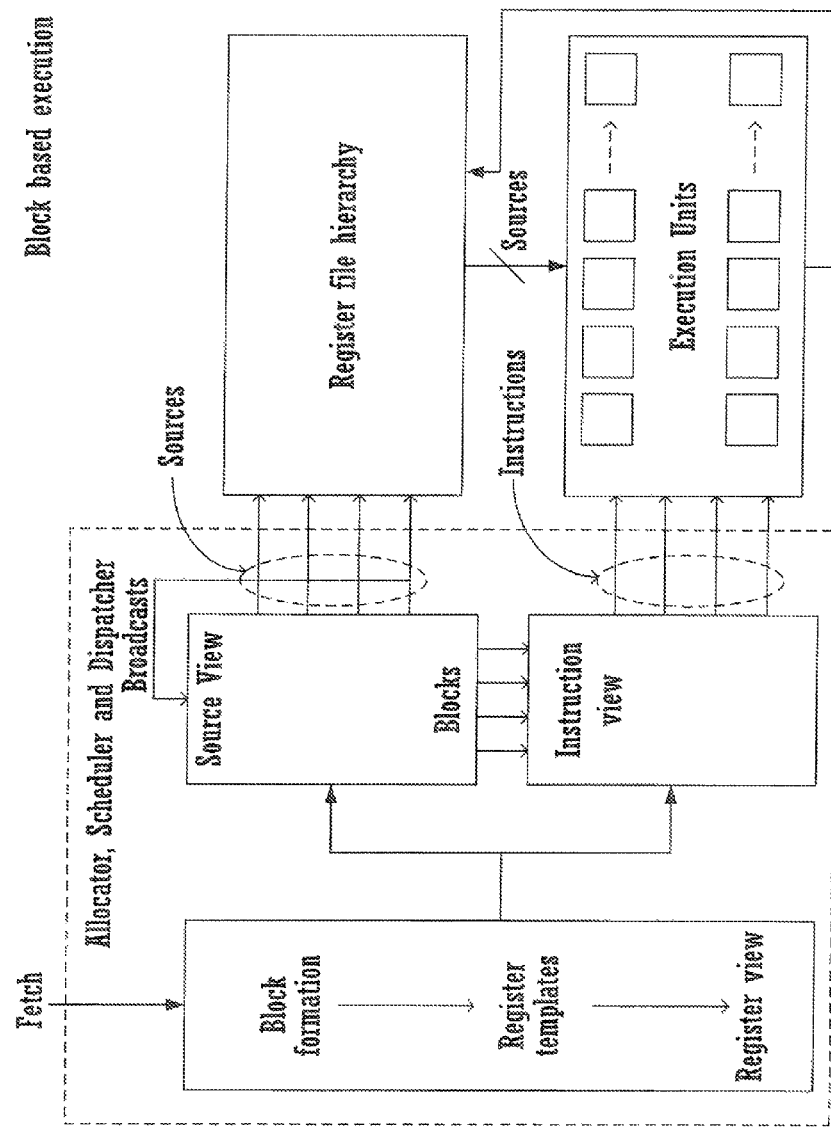
FIG. 20 shows an overview diagram of the hardware for instruction block-based execution and how it works with the source view, the instruction view, the register templates, and the register view in accordance with one embodiment of the present invention.

FIG. 20 shows an overview diagram of the hardware for instruction block-based execution and how it works with the source view, the instruction view, the register templates, and the register view in accordance with one embodiment of the present invention.

In this implementation, the allocator scheduler in dispatcher receives instructions fetched by the machine's front end. These instructions go through block formation in the manner we described earlier. As described earlier the blocks yield register templates and these register templates are used to populate the register view. From the source view the sources are transferred to the register file hierarchy and there are broadcasts back to the source view in the manner described above. The instruction view transfers instructions to the execution units. The instructions are executed by the execution units as the sources needed by the instructions coming from the register file hierarchy. These executed instructions are then transferred out of the execution unit and back into the register file hierarchy.

Figure 21:
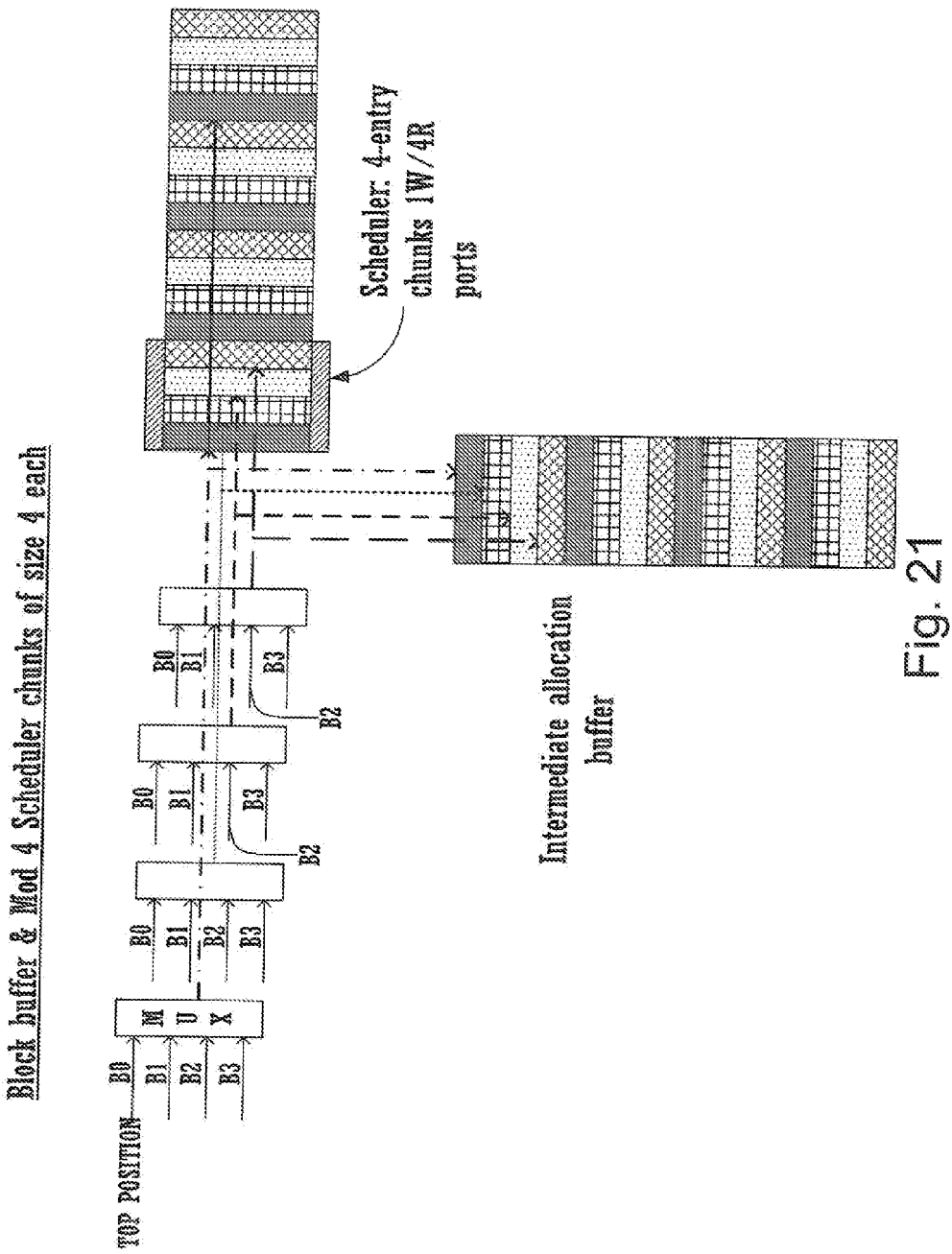
FIG. 21 shows an example of a chunking architecture in accordance with one embodiment of the present invention.

FIG. 21 shows an example of a chunking architecture in accordance with one embodiment of the present invention. The importance of chunking is that it reduces the number of write ports into each scheduler entry from 4 to 1 by using the four multiplexers shown, while still densely packing all the entries without forming bubbles.

The importance of chunking can be seen by the following example (e.g., noting that allocation of blocks in each cycle starts at the top position, in this case B0). Assuming in cycle 1, three blocks of instructions are to be allocated to the scheduler entries (e.g., the three blocks will occupy the first 3 entries in the scheduler). In the next cycle (e.g., cycle 2) another two blocks of instructions are to be allocated. In order to avoid creating bubbles in the scheduler array entries, the scheduler array entries have to be built with support for four write ports. This is expensive in terms of power consumption, timing, area, and the like. The chunking structure above simplifies all scheduler arrays to only have one write port by using the multiplexing structure before allocating to the arrays. In the above example, the B0 in cycle two will be selected by the last mux while B1 in cycle two will be selected by the first mux (e.g., going from left to right).

In this manner, each for entry chunk only needs one write port per entry and four read ports per entry. There is a trade-off in cost because the multiplexers must be implemented, however that cost is made up many times over in the savings from not having to implement four write ports per entry, as there can be very many entries.

FIG. 21 also shows an intermediate allocation buffer. If the scheduler arrays cannot accept all the chunks sent to them, then they can be stored temporarily in the intermediate allocation buffer. When the scheduler arrays have free space, the chunks will be transferred from the intermediate allocation buffer to the scheduler arrays.

Figure 22:
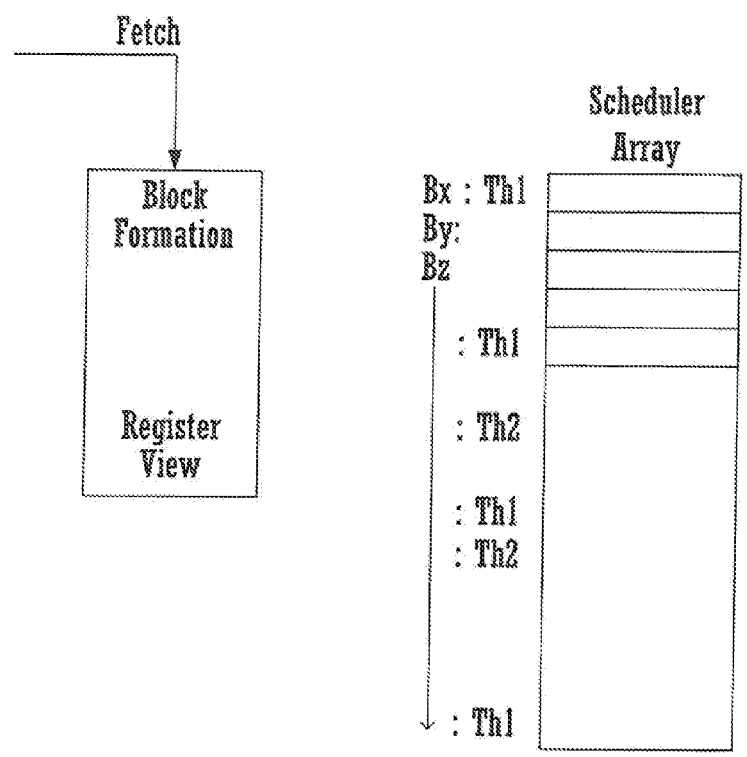
FIG. 22 shows a depiction of how threads are allocated in accordance with their block numbers and thread ID in accordance with one embodiment of the present invention.

FIG. 22 shows a depiction of how threads are allocated in accordance with their block numbers and thread ID in accordance with one embodiment of the present invention. Blocks are allocated to the scheduler array via a chunking implementation as described above. Each of the thread blocks maintain a sequential order among themselves using the block number. The blocks from different threads can be interleaved (e.g., Blocks for thread Th1 and blocks for thread Th2 are interleaved in the scheduler array. In this manner, blocks from different threads are present within the scheduler array.

Figure 23:
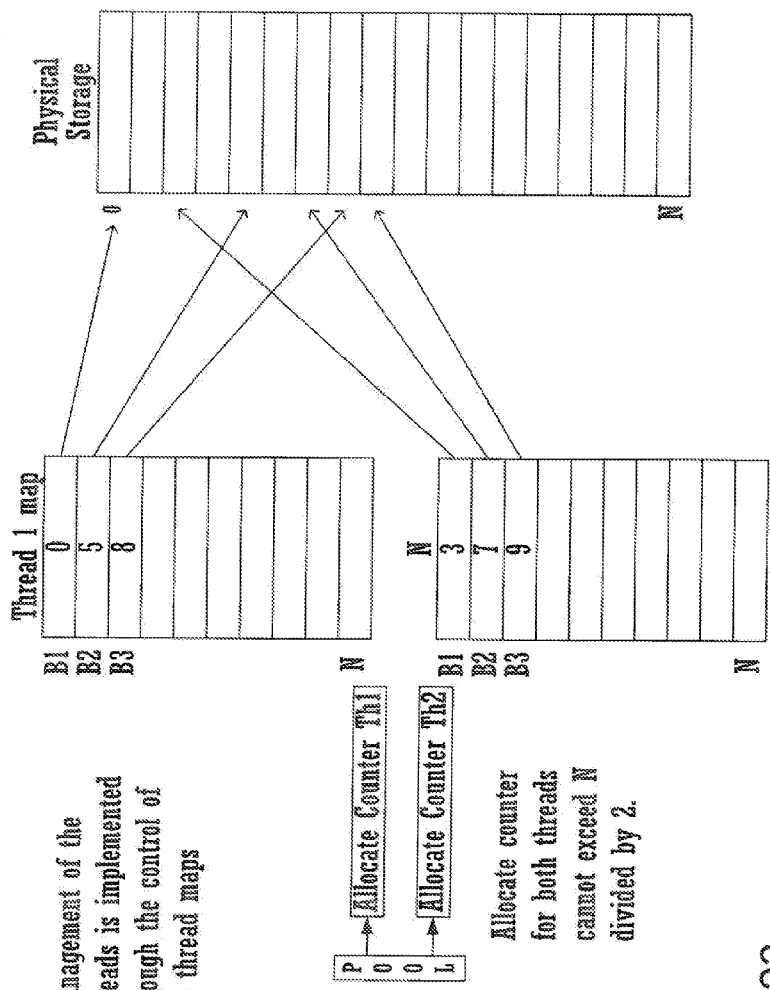
FIG. 23 shows an implementation of a scheduler using thread pointer maps that point to physical storage locations in order to manage multithreaded execution in accordance with one embodiment of the present invention.

FIG. 23 shows an implementation of a scheduler using thread pointer maps that point to physical storage locations in order to manage multithreaded execution in accordance with one embodiment of the present invention. In this embodiment, management of the threads is implemented through the control of the thread maps. For example here FIG. 23 shows thread 1 map and thread 2 map. The maps track the location of the blocks of the individual thread. The entries in the map 0.2 physical storage locations the entries in the map are allocated to blocks belonging to that thread. In this implementation, each thread has an allocation counter that counts for both threads. The overall count cannot exceed N divided by 2 (e.g., exceeding space available). The allocation counters have adjustable thresholds in order to implement fairness in the allocation of the total entries from the pool. The allocation counters can prevent one thread from using all of the available space.

Figure 24:
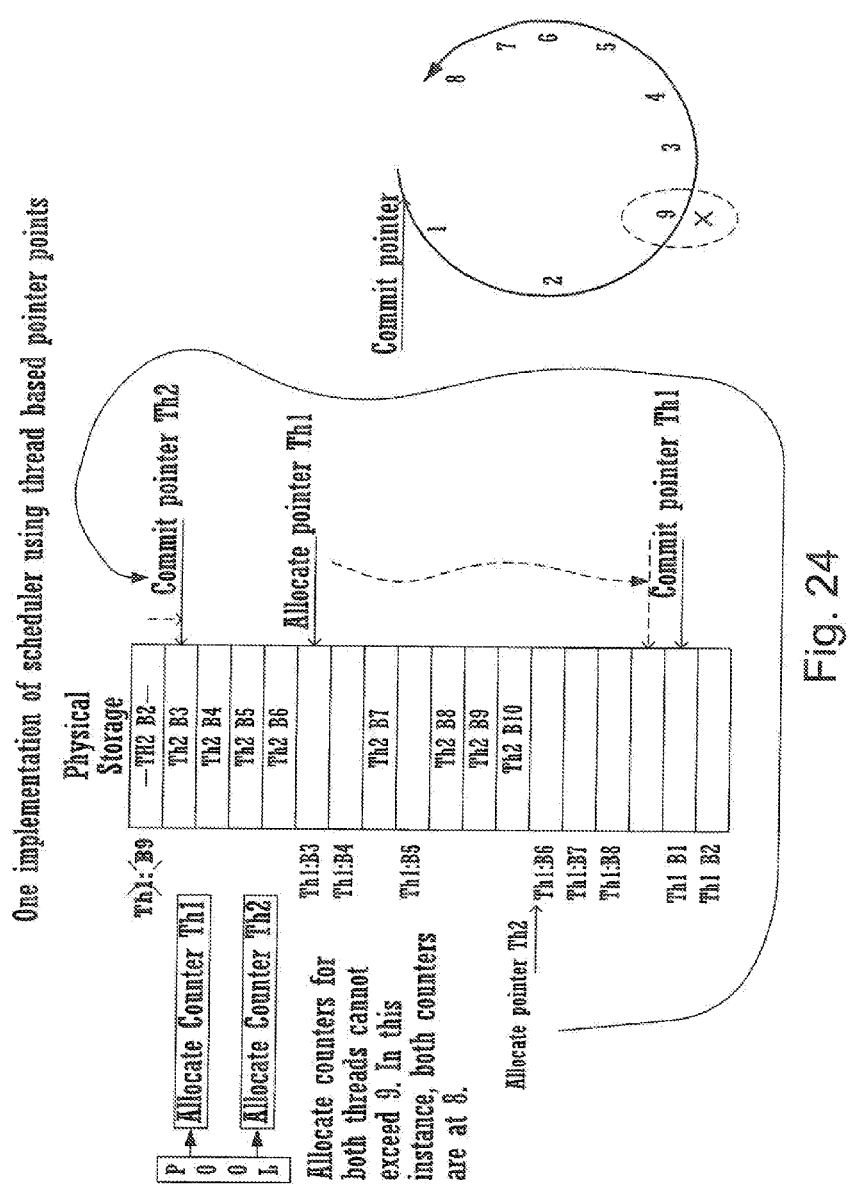

FIG. 24 shows another implementation of a scheduler using thread based pointer maps in accordance with one embodiment of the present invention. FIG. 24 shows a relationship between the commit pointer and the allocation pointer. As shown, each thread has a commit pointer and an allocate pointer the arrow shows how reality pointer for thread 2 can wrap around the physical storage allocating blocks B1 and B2, but it cannot allocate block B9 until the commit pointer for thread 2 moves down. This is shown by the position of the commit pointer of thread 2 and the strikethrough. The right-hand side of FIG. 24 shows a relationship between the allocation of blocks and the commit pointer as it moves around counterclockwise.

Figure 25:
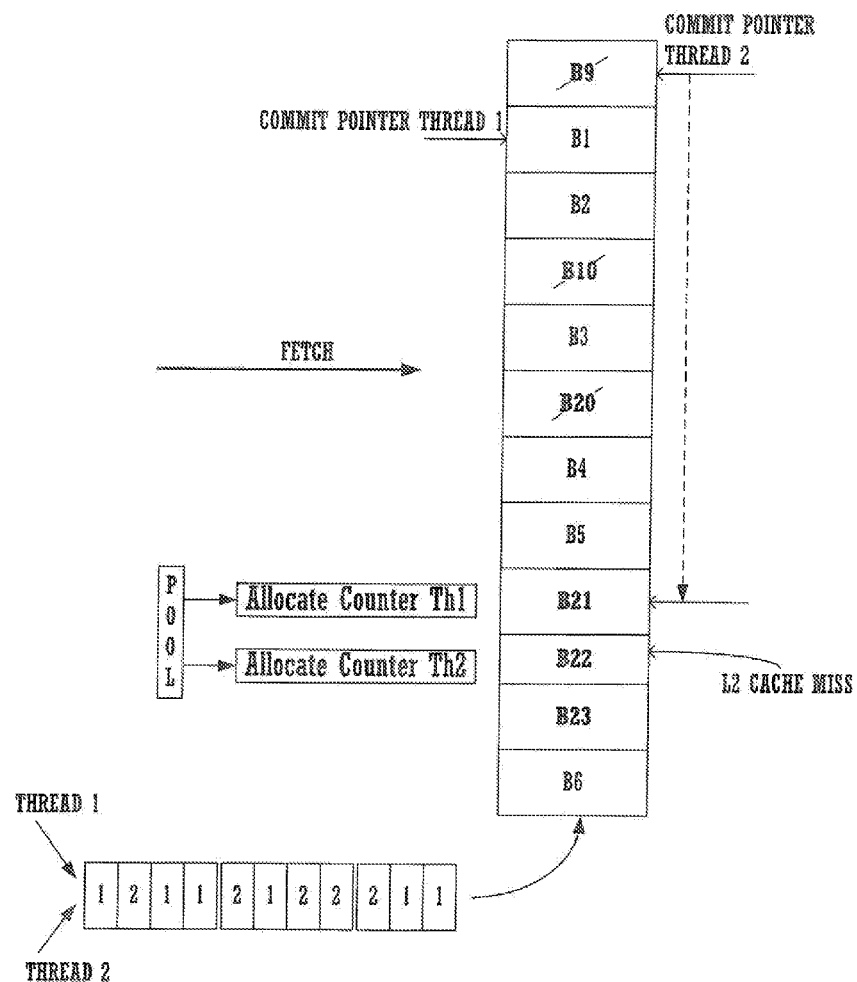
FIG. 25 shows a diagram of a dynamic calendar-based allocation of execution resources to threads in accordance with one embodiment of the present invention.

FIG. 25 shows a diagram of a dynamic calendar-based allocation of execution resources to threads in accordance with one embodiment of the present invention. Fairness can be dynamically controlled using the allocate counters based on the forward progress of each thread. If both threads are making substantial forward progress, then both allocation counters are set to the same threshold (e.g., 9). However if one thread makes slow forward progress, such as suffering from an L2 cache miss or such events, then the ratio of the threshold counters can be adjusted in the favor of the thread that is still making substantial forward progress. If one thread is stalled or suspended (e.g., is in wait or spin state waiting on an OS or IO response) the ratio can be completely adjusted to the other thread with the exception of a single return entry that is reserved for the suspended thread to signal the release of the wait state.

In one embodiment, the process starts off with a ratio of 50%:50%. Upon the L2 cache miss detection on block 22, the front end of the pipeline stalls any further fetch into the pipeline or allocation into the scheduler of thread 2 blocks. Upon retirement of thread 2 blocks from the scheduler, those entries will be made available for thread 1 allocation until the point where the new dynamic ratio of thread allocation is achieved. For example, 3 out the recently retired thread 2 blocks will be returned to the pool for allocation to thread 1 instead of thread 2, making the thread 1 to thread 2 ratio 75%:25%.

It should be noted that a stall of thread 2 blocks in the front of the pipeline might require flushing those blocks from the front of the pipeline if there is no hardware mechanism to bypass them (e.g., by thread 1 blocks by passing the stalled thread 2 blocks).

Figure 26:
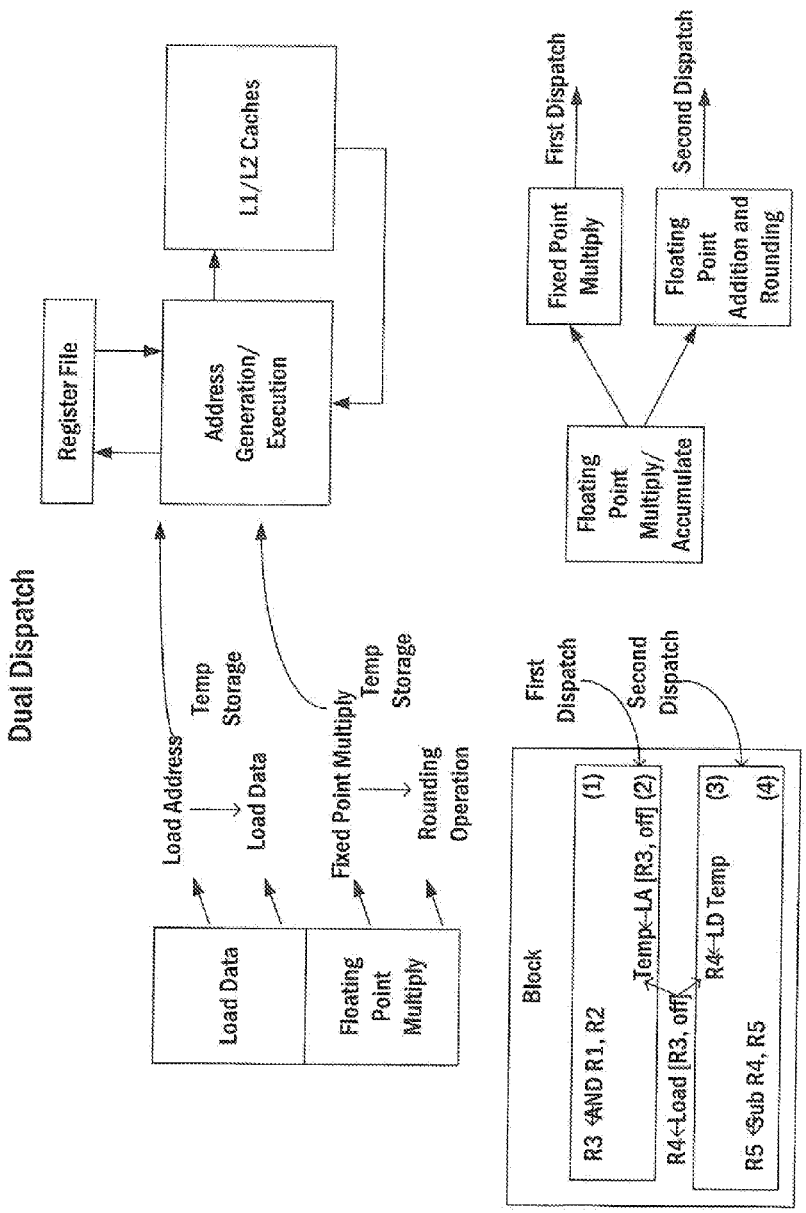
FIG. 26 diagrams a dual dispatch process in accordance with one embodiment of the present invention.

FIG. 26 diagrams a dual dispatch process in accordance with one embodiment of the present invention. Multi-dispatch generally encompasses dispatching a block (having multiple instruction within) multiple times such that different instructions with the block can execute on each pass through the execution units. One example would be a dispatch of an address calculation instruction followed by a subsequent dispatch that consumes the resulting data. Another example would be a floating point operation, where the first part is executed as fixed point operation and the second part is executed to complete the operation by performing rounding, flag generation/calculation, exponent adjustment or the like. Blocks are allocated, committed and retired atomically as a single entity.

A main benefit of multi-dispatch is that it avoids allocating multiple separate blocks into the machine window, thereby making the machine window effectively larger. A larger machine window means more opportunities for optimization and reordering.

Looking at the bottom left the FIG. 26, there is an instruction block depicted. This block cannot be dispatched in a single cycle because there is latency between the load address calculation and the load returning data from the caches/memory. So this block is first dispatched with its intermediate result being held as a transient state (its result is being delivered on the fly to the second dispatch without being visible to the architectural state). The first dispatch sends the two components 1 and 2 that are used in the address calculation and the dispatch of the LA. The second dispatch sends components 3 and 4 which are the execution parts of the load data upon the load returning data from the caches/memory.

Looking at the bottom right of FIG. 26 there is a floating point multiply accumulate operation depicted. In the case where the hardware does not have sufficient bandwidth of incoming sources to dispatch the operation in a single phase, then dual dispatch is used, as the multiply accumulate figure shows. The first dispatch is a fixed point multiply as shown. The second dispatch is a floating point addition rounding as shown. When both of these dispatched instructions execute, they effectively perform the floating point multiply/accumulate.

Figure 27:
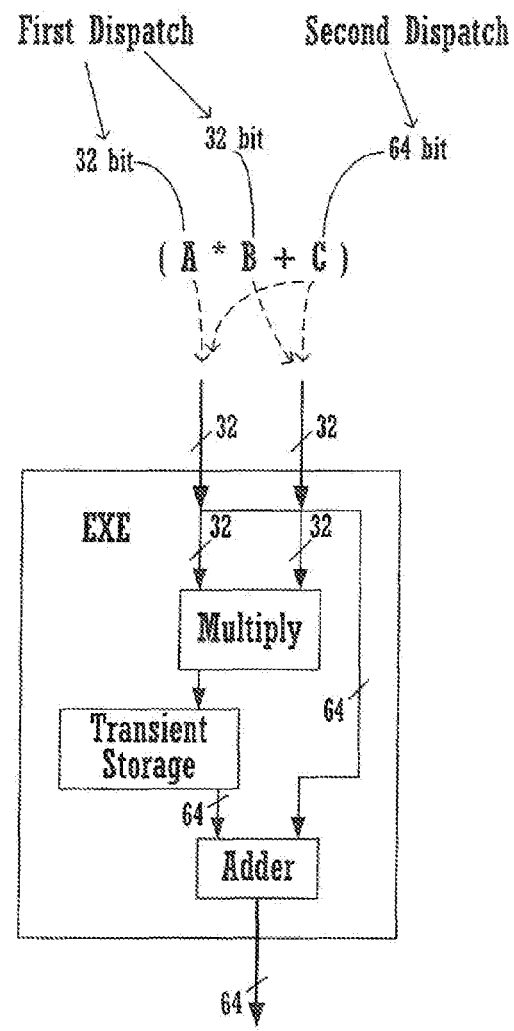
FIG. 27 diagrams a dual dispatch transient multiply-accumulate in accordance with one embodiment of the present invention.

FIG. 27 diagrams a dual dispatch transient multiply-accumulate in accordance with one embodiment of the present invention. As shown in FIG. 27, the first dispatch is the integer 32 bit multiply, and the second dispatch is the integer accumulate add. State communicated between the first dispatch and the second dispatch (the result of the multiply) is transient and not architecturally visible. The transient storage in one implementation can hold results of more than one multiplier and can tag them to identify the corresponding multiply accumulate pair, thereby allowing intermix of multiple multiply accumulate pairs being dispatch in an arbitrary fashion (e.g., interleaved, etc.).

Note that other instructions can use this same hardware for their implementation (e.g., floating point, etc.).

Figure 28:
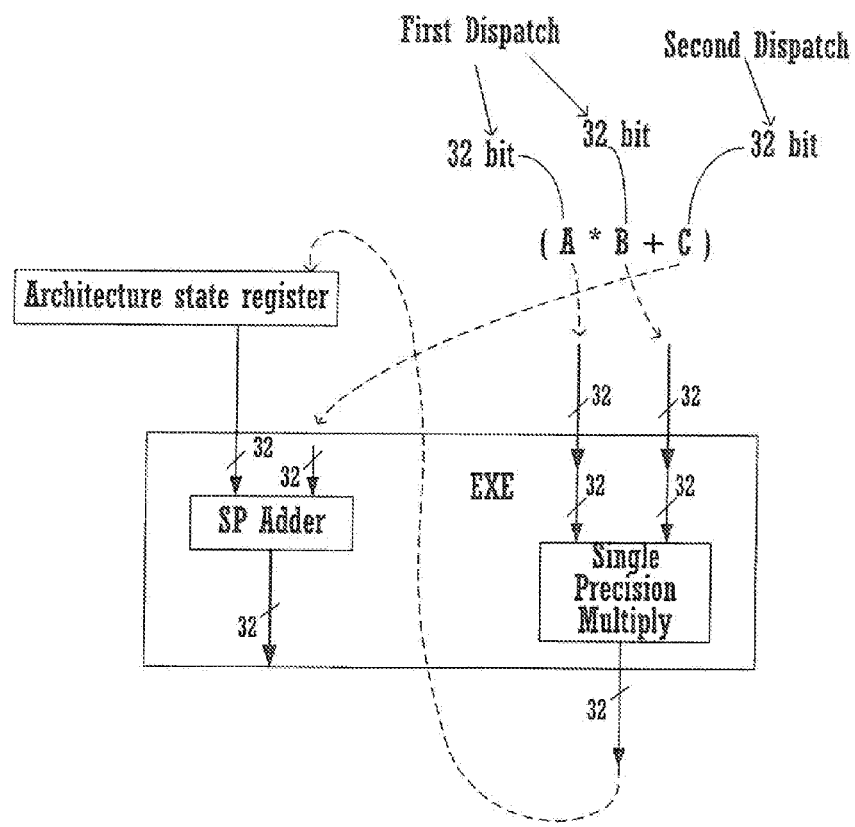
FIG. 28 diagrams a dual dispatch architecturally visible state multiply-add in accordance with one embodiment of the present invention.

FIG. 28 diagrams a dual dispatch architecturally visible state multiply-add in accordance with one embodiment of the present invention. The first dispatch is the single precision multiply, and the second dispatch is the single precision add. In this implementation, state information communicated between the first dispatch and the second dispatch (e.g., the result of the multiply) is architecturally visible since this storage is an architecture state register.

Figure 29:
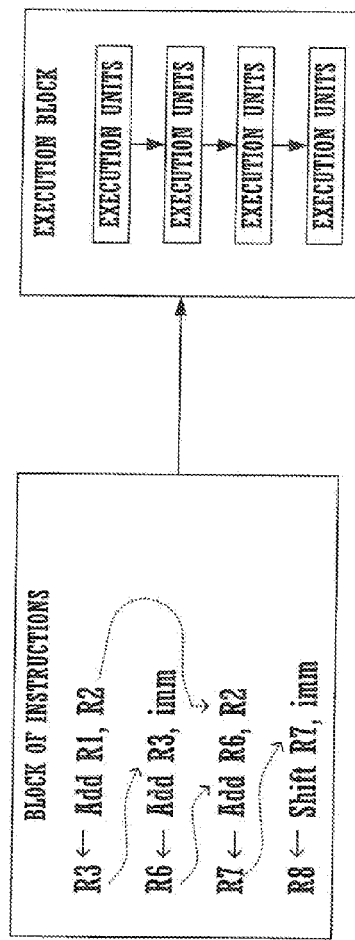
FIG. 29 shows an overview diagram of a fetch and formation of instruction blocks for execution on grouped execution units process in accordance with one embodiment of the present invention.

FIG. 29 shows an overview diagram of a fetch and formation of instruction blocks for execution on grouped execution units process in accordance with one embodiment of the present invention. Embodiments of the present invention utilize a process whereby instructions are fetched and formed as blocks by the hardware or dynamic converter/JIT. The instructions in the blocks are organized such that a result of an early instruction in the block feeds a source of a subsequent instruction in the block. This is shown by the dotted arrows in the block of instructions. This property enables the block to execute efficiently on the stacked execution units of the execution block. Instructions can also be grouped even if they can execute in parallel, such as if they share the same source (not shown explicitly in this figure).

One alternative to forming the blocks in hardware is to form them in software (statically or at runtime) where instruction pairs, triplets, quads, etc., are formed.

Other implementations of instruction grouping functionality can be found in commonly assigned U.S. Pat. No. 8,327,115.

Figure 30:
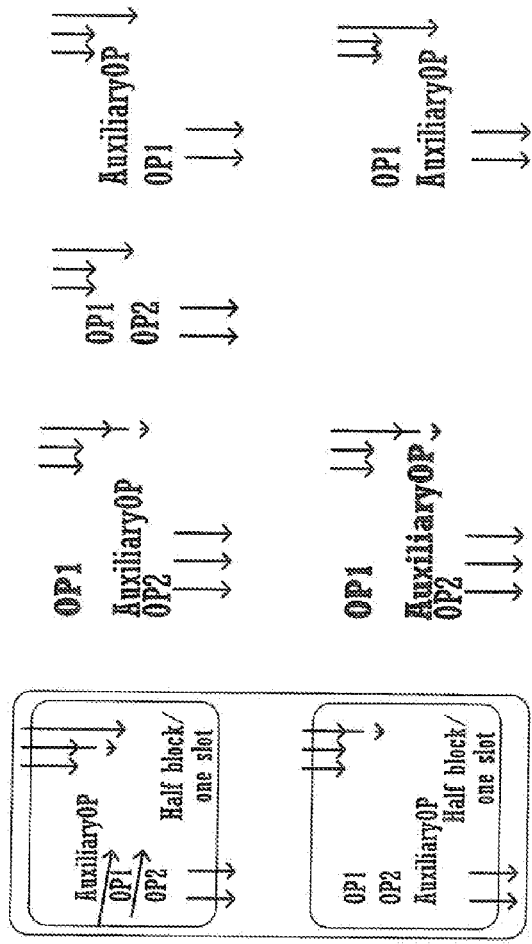
FIG. 30 shows an exemplary diagram of instruction grouping in accordance with one embodiment of the present invention. In the FIG. 30 embodiment two instructions are shown with a third auxiliary operation.

FIG. 30 shows an exemplary diagram of instruction grouping in accordance with one embodiment of the present invention. In the FIG. 30 embodiment two instructions are shown with a third auxiliary operation. The left-hand side of FIG. 31 instruction block comprising an upper half block/1 slot and a lower half block/1 slot. The vertical arrows coming down from the top indicates sources coming into the block while the vertical arrows going down from the bottom indicate destinations going back to memory. Proceeding from the left-hand side of FIG. 3 towards the right-hand side, different instruction combinations that are possible are illustrated. In this implementation, each half block can receive three sources and can pass on two destinations. OP1 and OP2 are normal operations. Auxiliary OPs are auxiliary operations such as a logical, a shift, a move, a sign extend, a branch, etc. The benefit of dividing the block into two halves is to allow the benefit of having each half dispatch on its own independently or otherwise together as one block dynamically (either for port utilization or because of resource constrains) based on dependency resolution, thus having better utilization of execution times, at the same time having the 2 halves correspond to one block allows the machine to abstract the complexity of 2 half blocks to be managed like one block (i.e. at allocate and retirement).

Figure 31:
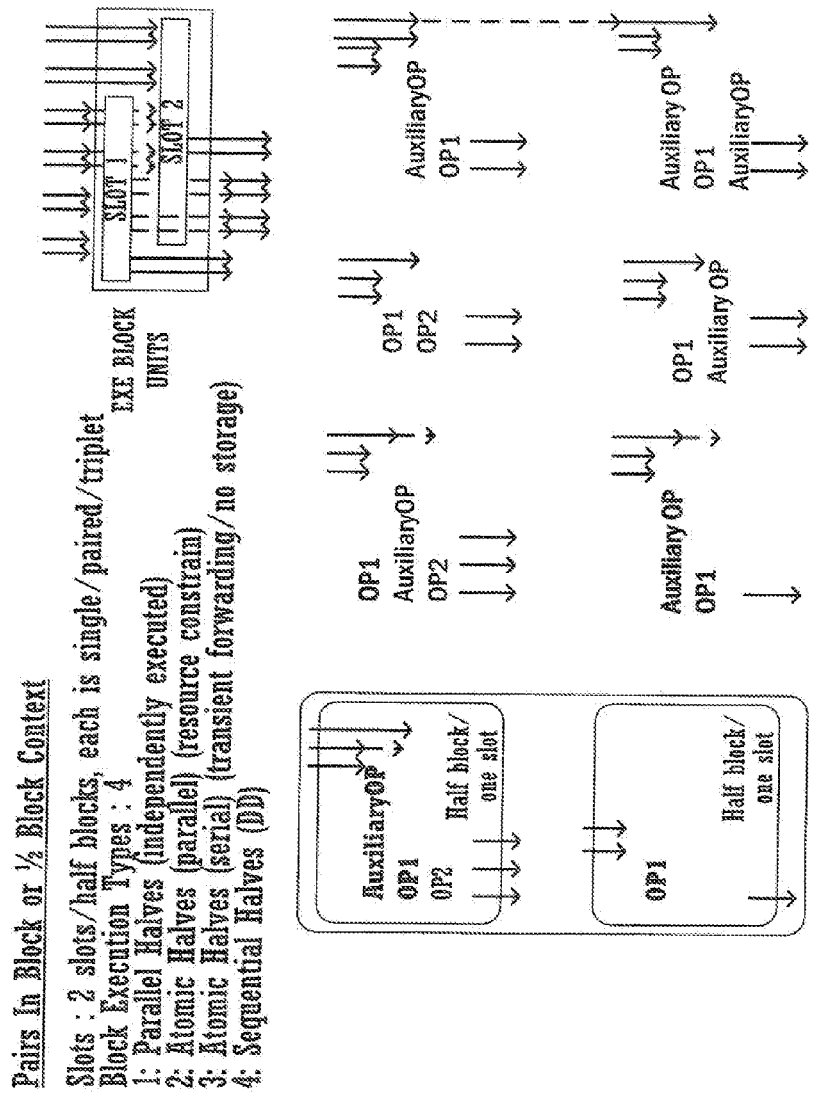
FIG. 31 shows how half block pairs within a block stack maps onto the execution block units in accordance with one embodiment of the present invention.

FIG. 31 shows how half block pairs within a block stack maps onto the execution block units in accordance with one embodiment of the present invention. As shown in the execution block, each execution block has two slots, slot 1 and slot 2. The objective is to s map the block onto the execution units such that the first half block executes on slot 1 and the second half block executes on slot 2. The objective is to allow the 2 half blocks to dispatch independently if the instruction group of each half block does not depend on the other half. The paired arrows coming into the execution block from the top are two 32-bit words of a source. The paired arrows leaving the execution block going down are two 32-bit words of a destination. Going from left to right of FIG. 31, different exemplary combinations of instructions are shown that are capable of being stacked onto the execution block units.

The top of FIG. 31 summarizes how the pairs of half blocks execute in a full block context or any half block context. Each of the s Execution blocks have two slots/half blocks and each one of the half bocks/execution slots executes either a single, paired or triplet grouped operations. There are four types of block execution types. The first is parallel halves (which allows each half block to independently execute once its own sources are ready but the 2 half blocks can still execute as one block on one execution unit if both halves are ready at the same time. The second is atomic parallel halves (which refers to half blocks that can execute in parallel because there is no dependency between the 2 halves but they are forced to execute together as one block because the resource sharing between the 2 halves make it preferred or necessary for the two halves to execute together atomically within the constraint of the resources available in each execution block). The third type is atomic serial halves s (which requires the first half to forward data to the second half, through transient forwarding with or without internal storage). The fourth type is sequential halves (as in dual dispatch) where the $2^{nd}$ half depend on the first half and is dispatched on a later cycle than the first one and forwards the data through external storage that are tracked for dependency resolution, similar to the dual dispatch case.

Figure 32:
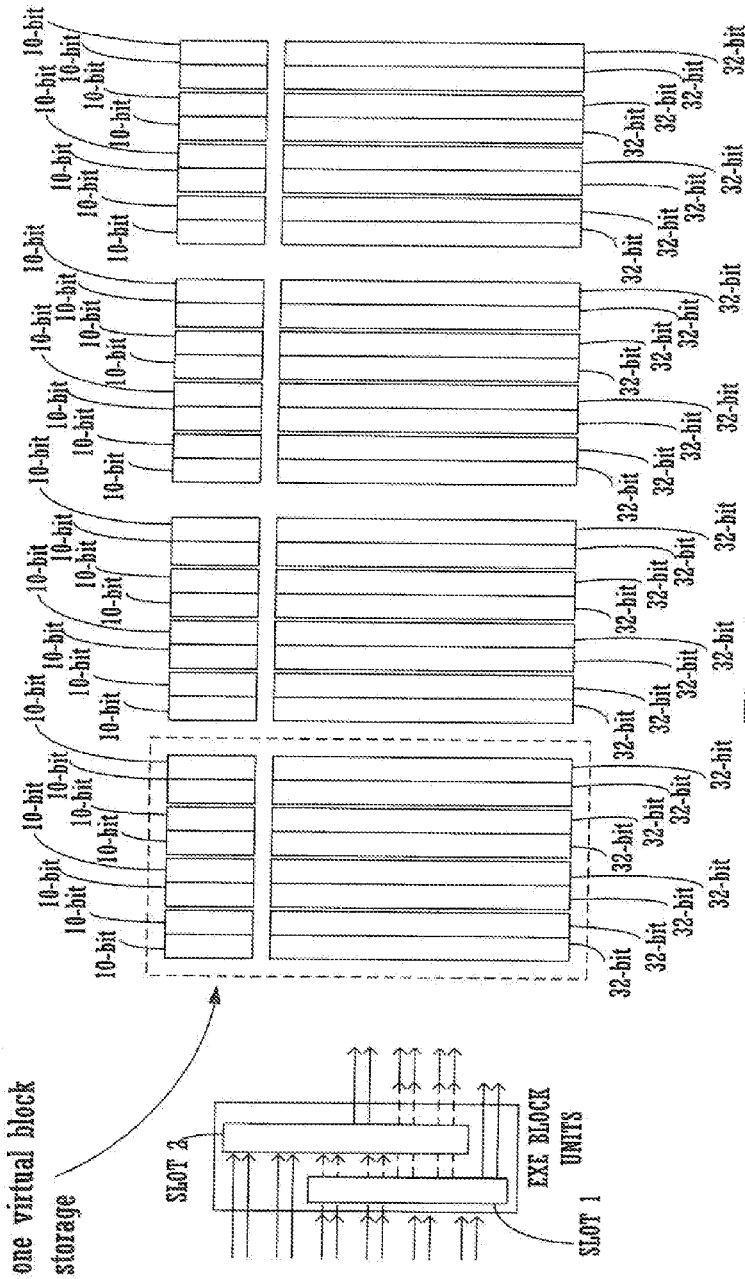
FIG. 32 shows a diagram depicting intermediate block results storage as a first level register file in accordance with one embodiment of the present invention.

FIG. 32 shows a diagram depicting intermediate block results storage as a first level register file in accordance with one embodiment of the present invention. Each group of registers represent a block of instructions (representing two half blocks) in which both 32 bit results as well as 64 bits results can be supported by using two 32 bit registers to support one 64 bit register. The storage per block assumes a virtual block storage, which means two half blocks from different blocks can write into the same virtual block storage. Combined results' storage of two half blocks that make up one virtual block storage.

Figure 33:
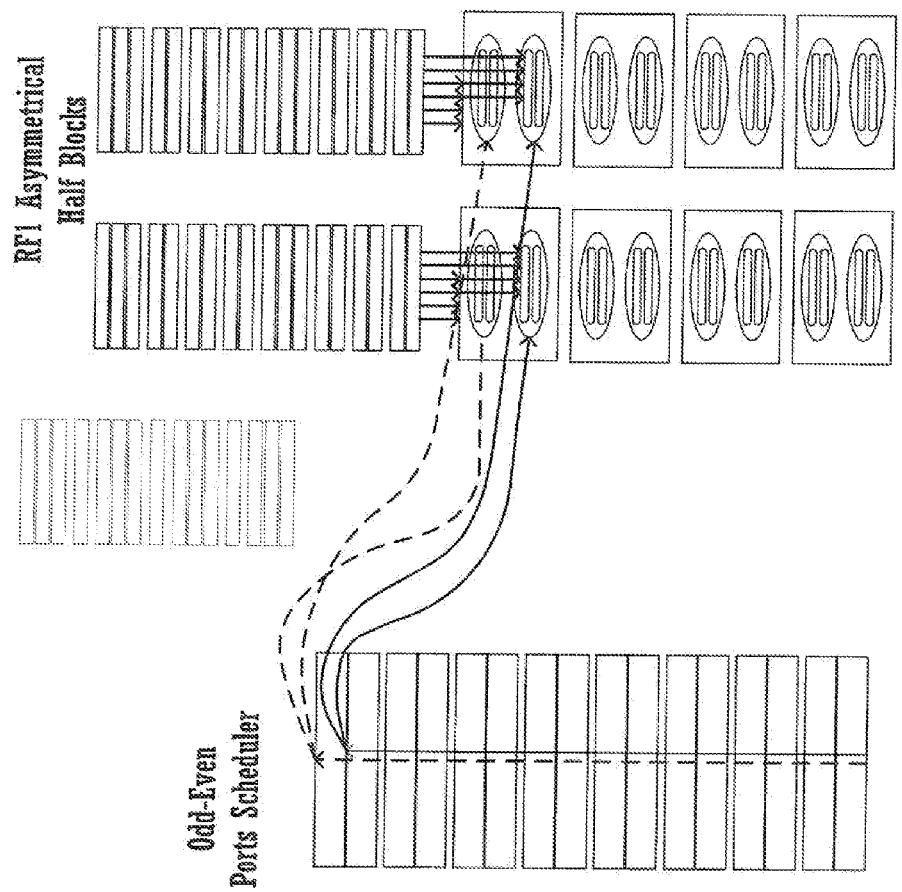
FIG. 33 shows an odd/even ports scheduler in accordance with one embodiment of the present invention.

FIG. 33 shows an odd/even ports scheduler in accordance with one embodiment of the present invention. In this implementation, the result storage is asymmetrical. Some of the result storage is three 64 bit result registers per half block while others are one 64 bit result register per half block, however alternative implementation can use symmetrical storage per half block and additionally could also employ 64-bit and 32-bit partition as described in FIG. 32. In these embodiments, storage is assigned per half block, as opposed to per block. This implementation reduces the number of ports needed for dispatch by using them as odd or even.

Figure 34:
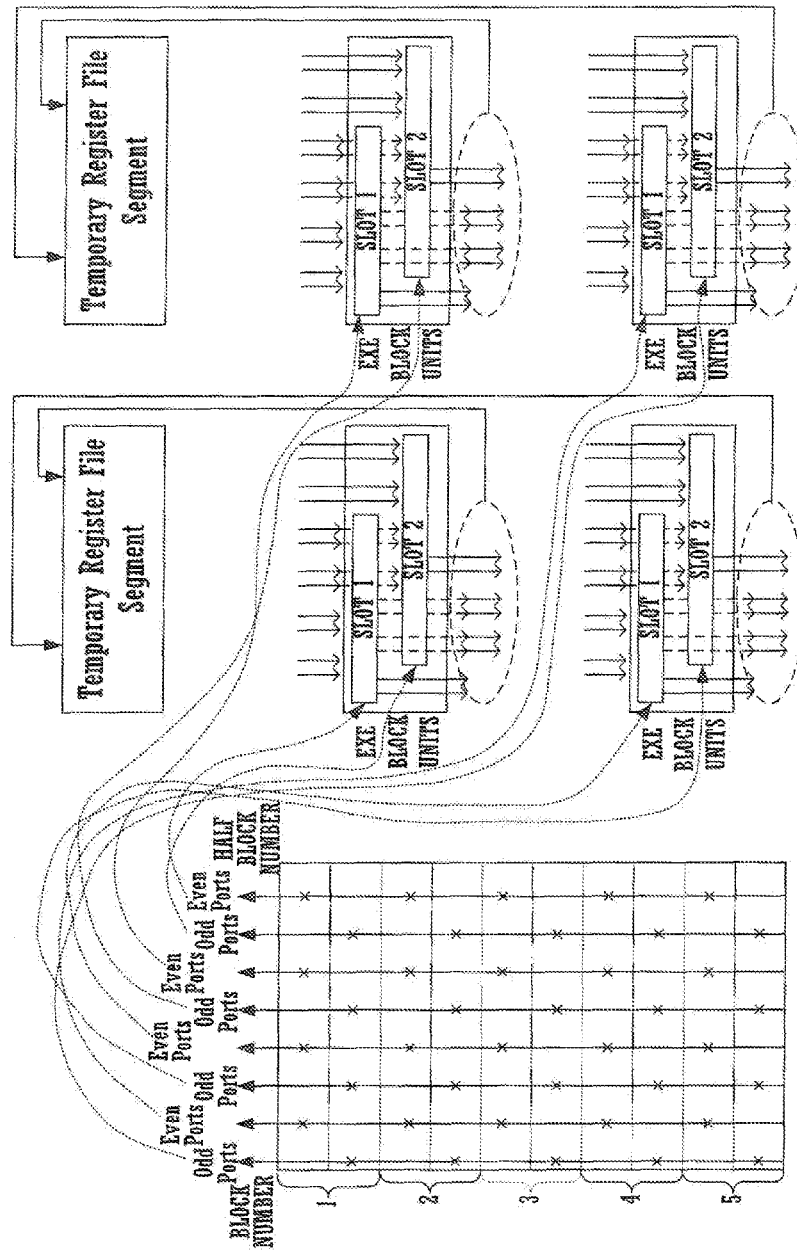
FIG. 34 shows a more detailed version of FIG. 33 where four execution units are shown receiving results from the scheduler array and writing outputs to a temporary register file segment.

FIG. 34 shows a more detailed version of FIG. 33 where four execution units are shown receiving results from the scheduler array and writing outputs to a temporary register file segment. The ports are attached at even and odd intervals. The left side of the scheduling array shows block numbers and the right side shows half block numbers.

Each core has even and odd ports into the scheduling array, where each port is connected to an odd or even half block position. In one implementation, the even ports and their corresponding half blocks can reside in a different core than the odd ports and their corresponding half blocks. In another implementation, the odd and even ports will be distributed across multiple different cores as shown in this figure. As described in the prior earlier filed commonly assigned patent application "EXECUTING INSTRUCTION SEQUENCE CODE BLOCKS BY USING VIRTUAL CORES INSTANTIATED BY PARTITIONABLE ENGINES" by Mohammad Abdallah, filed on Mar. 23, 2012, Ser. No. 13/428,440, which is incorporated herein in its entirety, the cores can be physical cores or virtual cores.

In certain types of blocks, one half of a block can be dispatched independently from the other half of the block. In other types of blocks, both halves of a block need to be dispatched simultaneously to the same execution block units. In still other types of blocks, the two halves of a block need to be dispatched sequentially (the second half after the first half).

Figure 35:
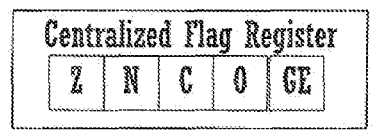
FIG. 35 shows a diagram depicting guest flag architecture emulation in accordance with one embodiment of the present invention.

FIG. 35 shows a diagram depicting guest flag architecture emulation in accordance with one embodiment of the present invention. The left-hand side of FIG. 35 shows a centralized flag register having five flags. The right-hand side of FIG. 35 shows a distributed flag architecture having distributed flag registers wherein the flags are distributed amongst registers themselves.

During architecture emulation, it is necessary for the distributed flag architecture to emulate the behavior of the centralized guest flag architecture. Distributed flag architecture can also be implemented by using multiple independent flag registers as opposed to a flag field associated with a data register. For example, data registers can be implemented as R0 to R15 while independent flag registers can be implemented as F0 to F3. Those flag registers in this case are not associated directly with the data registers.

Figure 36:
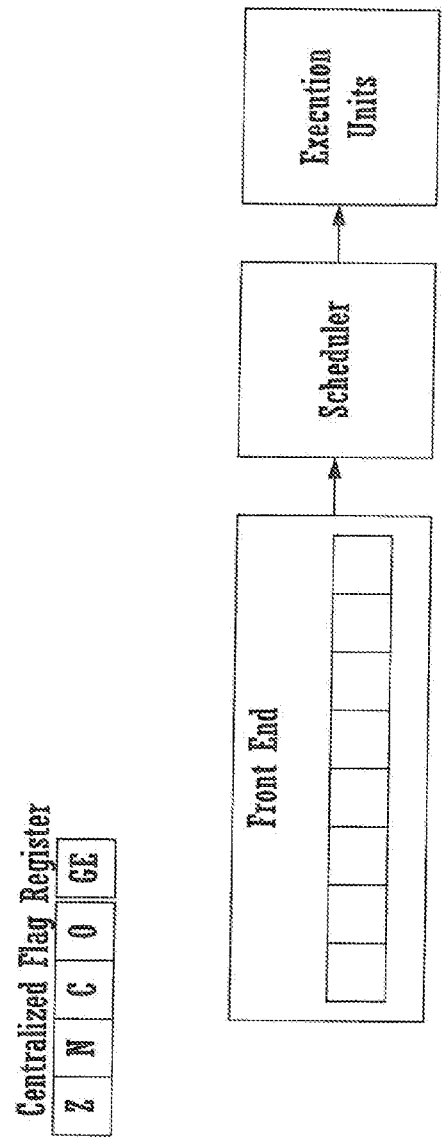
FIG. 36 shows a diagram illustrating the front end of the machine the scheduler and the execution units and a centralized flag register in accordance with one embodiment of the present invention.

FIG. 36 shows a diagram illustrating the front end of the machine the scheduler and the execution units and a centralized flag register in accordance with one embodiment of the present invention. In this implementation, the front end categorizes incoming instructions based on the manner in which they update guest instruction flags. In one embodiment, the guest instructions are categorized into 4 native instruction types, T1, T2, T3, and T4. T1-T4 are instruction types that indicate which flag fields that each guest instruction type updates. Guest instruction types update different guest instruction flags, based on their type. For example, logical guest instructions update T1 native instructions.

Figure 37:
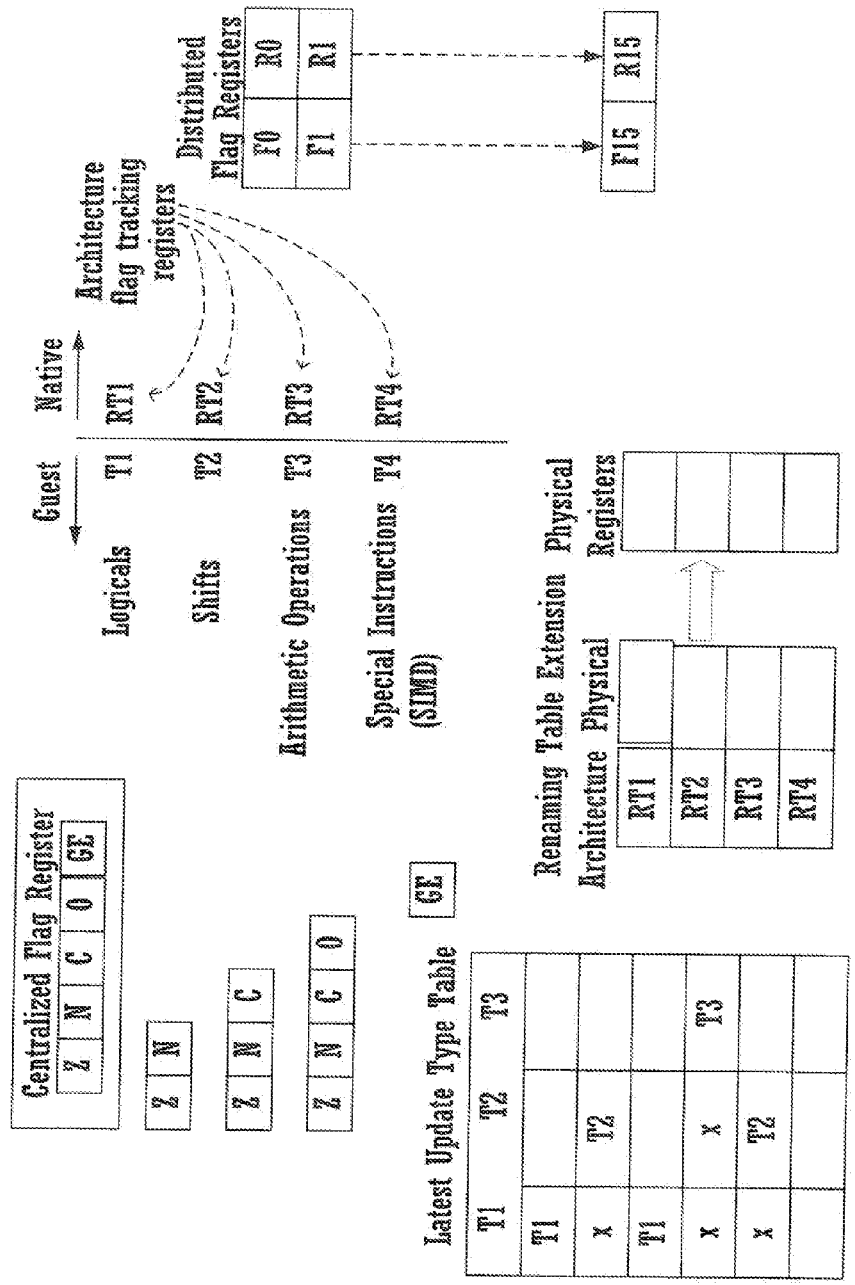
FIG. 37 shows a diagram of a centralized flag register emulation process as implemented by embodiments of the present invention.

FIG. 37 shows a diagram of a centralized flag register emulation process as implemented by embodiments of the present invention. The actors in FIG. 37 comprise a latest update type table, a renaming table extension, physical registers, and distributed flag registers. FIG. 37 is now described by the flowchart of FIG. 38.

Figure 38:
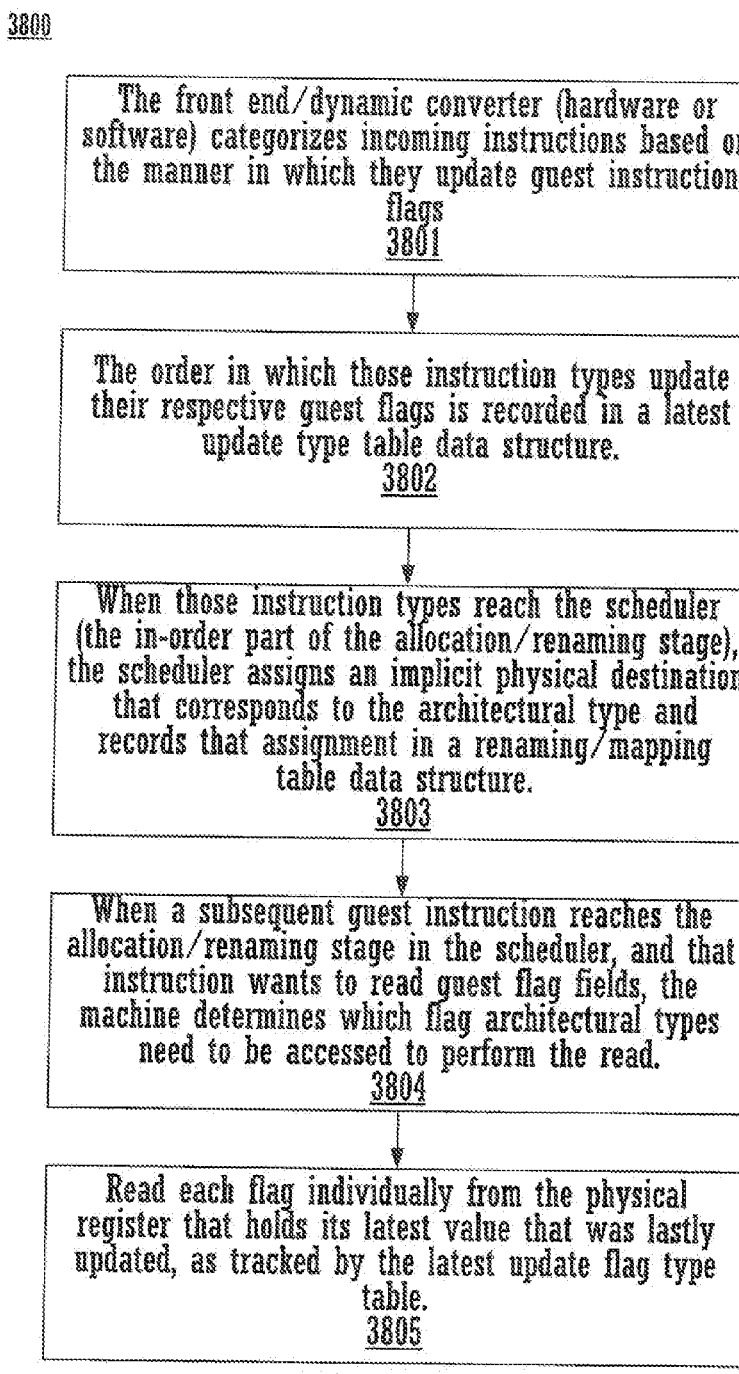
FIG. 38 shows a flowchart of the steps of a process 3800 of emulating centralized flag register behavior in a guest setting.

FIG. 38 shows a flowchart of the steps of a process 3800 of emulating centralized flag register behavior in a guest setting.

In step 3801, the front end/dynamic converter (hardware or software) categorizes incoming instructions based on the manner in which they update guest instruction flags. In one embodiment, the guest instructions are categorized into four flag architectural types, T1, T2, T3, and T4. T1-T4 are instruction types that indicate which flag fields that each guest instruction type updates. Guest instruction types update different guest flags, based on their type. For example, logical guest instructions update T1 type flags, shift guest instructions update T2 type flags, arithmetic guest instructions update T3 type flags, and special guest instructions update type T4 flags. It should be noted that guest instructions can be architectural instruction representation while native can be what the machine internally executes (e.g., microcode). Alternatively, guest instructions can be instructions from an emulated architecture (e.g., x86, java, ARM code, etc.).

In step 3802, the order in which those instruction types update their respective guest flags is recorded in a latest update type table data structure. In one embodiment, this action is performed by the front end of the machine.

In step 3803, when those instruction types reach the Scheduler (the in-order part of the allocation/renaming stage), the scheduler assigns an implicit physical destination that corresponds to the architectural type and records that assignment in a renaming/mapping table data structure.

And in step 3804, when a subsequent guest instruction reaches the allocation/renaming stage in the scheduler, and that instruction wants to read guest flag fields, (a) the machine determines which flag architectural types need to be accessed to perform the read. (b) if all needed flags are found in the same latest update flag type (e.g., as determined by the latest update type table), then the corresponding physical register (e.g., that maps to that latest flag type) is read to obtain the needed flags. (c) if all needed flags cannot be found in a same latest update flag type, then each flag needs to be read from the corresponding physical register that maps to the individual latest update flag type.

And in step 3805, each flag is being read individually from the physical register that holds its latest value that was lastly updated, as tracked by the latest update flag type table.

It should be noted that if a latest update type is inclusive of another type then all then all subset types have to map to the same physical registers of the super set type.

At retirement, that destination flag fields are merged with a cloned centralized/guest flag architecture register. It should be noted that the cloning is performed due to the fact that the native architecture utilizes a distributed flag architecture as opposed to a single register centralized flag architecture.

Examples of instructions that update certain flag types:
CF,OF,SF,ZR—arithmetic instruction and load/write flags instructions
SF, ZF and conditional CF—logicals and shifts
SF, ZF—moves/loads, EXTR, some multiplies
ZF—POPCNT and STREX[P]
GE—SIMD instructions ???

Examples of conditions/predications that read certain flags:
0000 EQ Equal Z==1
0001 NE Not equal, or Unordered Z==0
0010 CS b Carry set, Greater than or equal, or Unordered C==1
0011 CC c Carry clear, Less than C==0
0100 MI Minus, negative, Less than N==1
0101 PL Plus, Positive or zero, Greater than or equal to, Unordered N==00110 VS Overflow, Unordered V==1
0111 VC No overflow, Not unordered V==0
1000 HI Unsigned higher, Greater than, Unordered C==1 and Z==0
1001 LS Unsigned lower or same, Less than or equal C==0 or Z==1
1010 GE Signed greater than or equal, Greater than or equal N==V
1011 LT Signed less than, Less than, Unordered N!=V
1100 GT Signed greater than, Greater than Z==0 and N==V
1101 LE Signed less than or equal, Less than or equal, Unordered Z==1 or N!=V
1110 None (AL), Always (unconditional), Any flag set to any value.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of populating a register view data structure by using a register template, the method comprising:
receiving an incoming instruction sequence using a global front end;
grouping instructions of the sequence to form instruction blocks;
tracking instruction destinations by populating the register template with block numbers corresponding to the instruction blocks, wherein the block numbers corresponding to the instruction blocks indicate interdependencies among the instruction blocks, wherein the tracking comprises an incoming instruction block writing its respective block number into fields of the register template corresponding to destination registers referred to by the incoming instruction block, and wherein further the register template is updated by an arrival of the incoming instruction block;
the incoming instruction block reading fields of the register template corresponding to its register sources to retrieve its instruction sources;
populating a register view data structure, wherein the register view data structure is configured to store the instruction destinations corresponding to the instruction blocks as recorded by the register template; and
using the register view data structure to track a machine state for use after a branch miss-prediction in accordance with execution of the instruction blocks by storing prior snapshots of the register template in an array, wherein each instruction block comprises an entry in the array.

2. The method of claim 1, wherein the register view data structure comprises a scheduler architecture.

3. The method of claim 1, wherein information about registers referred to by the instruction blocks is stored in the register view data structure.

4. The method of claim 1, wherein information about sources referred to by the instruction blocks is stored in a source view data structure.

5. The method of claim 1, wherein information about instructions referred to by the instruction blocks is stored in an instruction view data structure.

6. The method of claim 1, wherein the register template comprises data structures configured for storing dependency and inheritance information referred to by the instruction blocks.

7. A non-transitory computer readable media having computer readable code which when executed by a computer system causes the computer system to perform a method of populating a register view data structure by using a register template, the method comprising:
receiving an incoming instruction sequence using a global front end;
grouping instructions of the sequence to form instruction blocks;
tracking instruction destinations by populating the register template with block numbers corresponding to the instruction blocks, wherein the block numbers corresponding to the instruction blocks indicate interdependencies among the instruction blocks, wherein the tracking comprises an incoming instruction block writing its respective block number into fields of the register template corresponding to destination registers referred to by the incoming instruction block, and wherein further the register template is updated by an arrival of the incoming instruction block;
the incoming instruction block reading fields of the register template corresponding to its register sources to retrieve its instruction sources;
populating a register view data structure, wherein the register view data structure is configured to stores the instruction destinations corresponding to the instruction blocks as recorded by the register template; and
using the register view data structure to track a machine state for use after a branch miss-prediction in accordance with execution of the instruction blocks by storing prior snapshots of the register template in an array, wherein each instruction block comprises an entry in the array.

8. The computer readable media of claim 7, wherein the register view data structure comprises a scheduler architecture.

9. The computer readable media of claim 7, wherein information about registers referred to by the instruction blocks is stored in the register view data structure.

10. The computer readable media of claim 7, wherein information about sources referred to by the instruction blocks is stored in a source view data structure.

11. The computer readable media of claim 7, wherein information about instructions referred to by the instruction blocks is stored in an instruction view data structure.

12. The computer readable media of claim 7, wherein the register template comprises data structures is configured for storing dependency and inheritance information referred to by the instruction blocks.

13. A computer system having a processor coupled to a memory, the processor configured to implement a method of populating a register view data structure by using a register template, the method comprising:
receiving an incoming instruction sequence using a global front end;
grouping instructions of the sequence to form instruction blocks;
tracking instruction destinations by populating the register template with block numbers corresponding to the instruction blocks, wherein the block numbers corresponding to the instruction blocks indicate interdependencies among the instruction blocks, wherein the tracking comprises an incoming instruction block writing its respective block number into fields of the register template corresponding to destination registers referred to by the incoming instruction block, and wherein further the register template is updated by an arrival of the incoming instruction block;
the incoming instruction block reading fields of the register template corresponding to its register sources to retrieve its instruction sources;
populating a register view data structure, wherein the register view data structure is configured to stores the instruction destinations corresponding to the instruction blocks as recorded by the register template; and
using the register view data structure to track a machine state for use after a branch miss-prediction in accordance with execution of the instruction blocks by storing prior snapshots of the register template in an array, wherein each instruction block comprises an entry in the array.

14. The computer system of claim 13, wherein the register view data structure comprises a scheduler architecture.

15. The computer system of claim 13, wherein information about registers referred to by the instruction blocks is stored in the register view data structure.

16. The computer system of claim 13, wherein information about sources referred to by the instruction blocks is stored in a source view data structure.

17. The computer system of claim 13, wherein information about instructions referred to by the instruction blocks is stored in an instruction view data structure.

18. The computer system of claim 13, wherein the register template comprises data structures storing dependency and inheritance information referred to by the instruction blocks.

* * * * *